(12) United States Patent
Thompson et al.

(10) Patent No.: US 10,740,139 B2
(45) Date of Patent: Aug. 11, 2020

(54) METHOD AND SYSTEM FOR PERFORMING HYPERCONVERGENCE USING BLOCKCHAINS

(71) Applicant: Interbit Ltd., Calgary (CA)

(72) Inventors: Thomas Thompson, Monaco (MC); Dallas Hoffman, Vancouver (CA)

(73) Assignee: North Peak Resources Ltd., Toronto, CA (US)

( * ) Notice: Subject to any disclaimer, the term of this patent is extended or adjusted under 35 U.S.C. 154(b) by 0 days.

(21) Appl. No.: 16/732,067

(22) Filed: Dec. 31, 2019

(65) Prior Publication Data

US 2020/0150994 A1 May 14, 2020

Related U.S. Application Data

(63) Continuation of application No. PCT/CA2019/050612, filed on May 8, 2019.

(60) Provisional application No. 62/733,589, filed on Sep. 19, 2018.

(51) Int. Cl.
*G06F 9/455* (2018.01)
*H04L 9/06* (2006.01)

(52) U.S. Cl.
CPC ........ *G06F 9/45558* (2013.01); *H04L 9/0643* (2013.01); *G06F 2009/45579* (2013.01); *G06F 2009/45583* (2013.01); *H04L 2209/38* (2013.01)

(58) Field of Classification Search
CPC .................................................. G06F 9/45558
See application file for complete search history.

(56) References Cited

U.S. PATENT DOCUMENTS

| | | | |
|---|---|---|---|
| 2018/0167217 A1 | 6/2018 | Brady et al. | |
| 2018/0323963 A1* | 11/2018 | Stollman | H04L 9/3239 |
| 2020/0073962 A1* | 3/2020 | Natarajan | G06F 16/27 |

OTHER PUBLICATIONS

International Search Report and Written Opinion for International Patent Application No. PCT/CA2019/050612 dated Jul. 30, 2019.
Cachin C. et al., Blockchain Consensus Protocols in the Wild, IBM Research—Zurich, Jul. 7, 2017, pp. 1-24.
Popejoy, S., "Confidentiality Private Blockchain," Revision v1.0, Aug. 2016, pp. 1-9.
Martino, W., "The first scalable, high performance private blockchain," Revision v1.0, Aug. 2016, pp. 1-9.
Quaintance, M. et al., "Chainweb Protocol Security Calculations," Work in Progress—Draft v7, Jan. 2018, pp. 1-8.
Martino, W. et al., "Chainweb: A Proof-of-Work Parallel-Chain Architecture for Massive Throughput," Draft v15, Jan. 2018, pp. 1-19.

(Continued)

*Primary Examiner* — Charlie Sun

(57) ABSTRACT

Methods, systems, and techniques for performing hyperconvergence using blockchains involve running a hypervisor on a computer node, in which the hypervisor runs a host blockchain; and running on the hypervisor an emulated blockchain that emulates the host blockchain. The host blockchain may communicate with other blockchains via the emulated blockchain, thereby receiving actions to perform from those other blockchains and permitting those other blockchains to control the hardware on which the hypervisor and host blockchain run.

18 Claims, 14 Drawing Sheets

(56) References Cited

OTHER PUBLICATIONS

Martino, W. et al., "The Kadena Public Blockchain Project Summary Whitepaper," Version 1.2, Nov. 2018, pp. 1-7.
Buchman, E., "Tendermint: Byzantine Fault Tolerance in Ages of Blockchains," A Thesis present to the University of Guelph, Jun. 2016.
Kwan, J. et al. "Cosmos A Network of Distributed Ledgers," Aug. 16, 2017, available at: https://github.com/cosmos/cosmos/blob/9bbac9ef80a7f3fd067cab338bcf433ef73fa19/WHITEPAPER.md.

* cited by examiner

METHOD AND SYSTEM FOR PERFORMING HYPERCONVERGENCE USING BLOCKCHAINS

TECHNICAL FIELD

The present disclosure is directed at methods, systems, and techniques for performing hyperconvergence using blockchains.

BACKGROUND

A blockchain is a database and/or application execution engine that is distributed on computer nodes and that is inherently resistant to corruption and tampering. While initially used for bitcoin, blockchain has applications that extend significantly beyond bitcoin and the financial services industry generally.

SUMMARY

According to a first aspect, there is provided a method comprising: running a first hypervisor on a first computer node, wherein the hypervisor comprises a first host blockchain; and running on the hypervisor a first emulated blockchain that emulates the first host blockchain.

The method may further comprise: determining a subsequent state of the host blockchain; removing, from the subsequent state of the host blockchain, state information representing the emulated blockchain; and adding a new block to the emulated blockchain, wherein the new block comprises the subsequent state of the host blockchain with the state information representing the emulated blockchain removed.

Determining the subsequent state of the host blockchain may comprise: retrieving, by the host blockchain, an action received by the emulated blockchain; and performing, by the host blockchain, the action retrieved from the emulated blockchain.

The action received by the emulated blockchain may be a system-level action.

The method may further comprise running a guest blockchain on the hypervisor, wherein the host blockchain allocates at least some hardware resources of the node in response to a request from the guest blockchain.

The action received by the emulated blockchain may be received from the guest blockchain.

The method may further comprise receiving, from the guest blockchain at the emulated blockchain: lineage verification data that permits the host blockchain to verify a lineage of at least one block of the guest blockchain; a proper subset of all non-header data stored using the at least one block, wherein the proper subset of the non-header data comprises the action received from the guest blockchain; and validity verification data that permits the host blockchain to verify validity of the proper subset of all non-header data sent to the host blockchain from the guest blockchain.

The method may further comprise the host blockchain performing the action received by the emulated blockchain and sending a response to the guest blockchain.

The response may comprise: lineage verification data that permits the guest blockchain to verify a lineage of at least one block of the host blockchain; a proper subset of all non-header data stored using the at least one block, wherein the proper subset of the non-header data comprises an acknowledgement of whether the action was performed; and validity verification data that permits the guest blockchain to verify validity of the proper subset of all non-header data sent to the guest blockchain from the host blockchain.

The subsequent state of the host blockchain with the state information representing the emulated blockchain removed may comprise a listing of and a state of the guest blockchain.

A second hypervisor may be running on a second computer node. The second hypervisor may comprise a second host blockchain. A second emulated blockchain that emulates the second host blockchain may be running on the second hypervisor, and the action received by the first emulated blockchain may be received from the second emulated blockchain.

The method may further comprise receiving, from the second emulated blockchain at the first emulated blockchain: lineage verification data that permits the first host blockchain to verify a lineage of at least one block of the second host blockchain; a proper subset of all non-header data stored using the at least one block, wherein the proper subset of the non-header data comprises the action received from the second emulated blockchain; and validity verification data that permits the first host blockchain to verify validity of the proper subset of all non-header data sent to the first emulated blockchain from the second emulated blockchain.

The method may further comprise the first host blockchain performing the action received by the first emulated blockchain and sending a response to the second emulated blockchain.

The response sent to the second emulated blockchain may comprise: lineage verification data that permits the second host blockchain to verify a lineage of at least one block of the first host blockchain; a proper subset of all non-header data stored using the at least one block, wherein the proper subset of the non-header data comprises an acknowledgement of whether the action received by the first emulated blockchain was performed; and validity verification data that permits the second host blockchain to verify validity of the proper subset of all non-header data sent to the second emulated blockchain from the first host blockchain.

Adding a new block to the emulated blockchain may be performed by the first host blockchain such that the emulated blockchain is at least one state behind a state of the first host blockchain.

The new block added to the emulated blockchain may be distributed to all nodes hosting the emulated blockchain.

The subsequent state may be a last one of multiple subsequent states determined of the host blockchain, the multiple subsequent states may be determined in response to respective actions, and the new block added to the emulated blockchain may comprise a list of the respective actions.

According to another aspect, there is provided a system comprising: network interface hardware for interfacing with another computer node; non-volatile memory having stored on it a first host blockchain and a first emulated blockchain that emulates the first host blockchain; a processor communicatively coupled to the data store and network interface hardware; and a memory communicatively coupled to the processor and having stored on it computer program code that is executable by the processor and that when executed by the processor causes the processor to perform the method of any of the foregoing aspects or suitable combinations thereof.

A non-transitory computer readable medium having stored thereon computer program code that is executable by a processor and that when executed by the processor causes the processor to perform the method of any of the foregoing aspects or suitable combinations thereof.

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

In the accompanying drawings, which illustrate one or more example embodiments.

DETAILED DESCRIPTION

Figure 1:
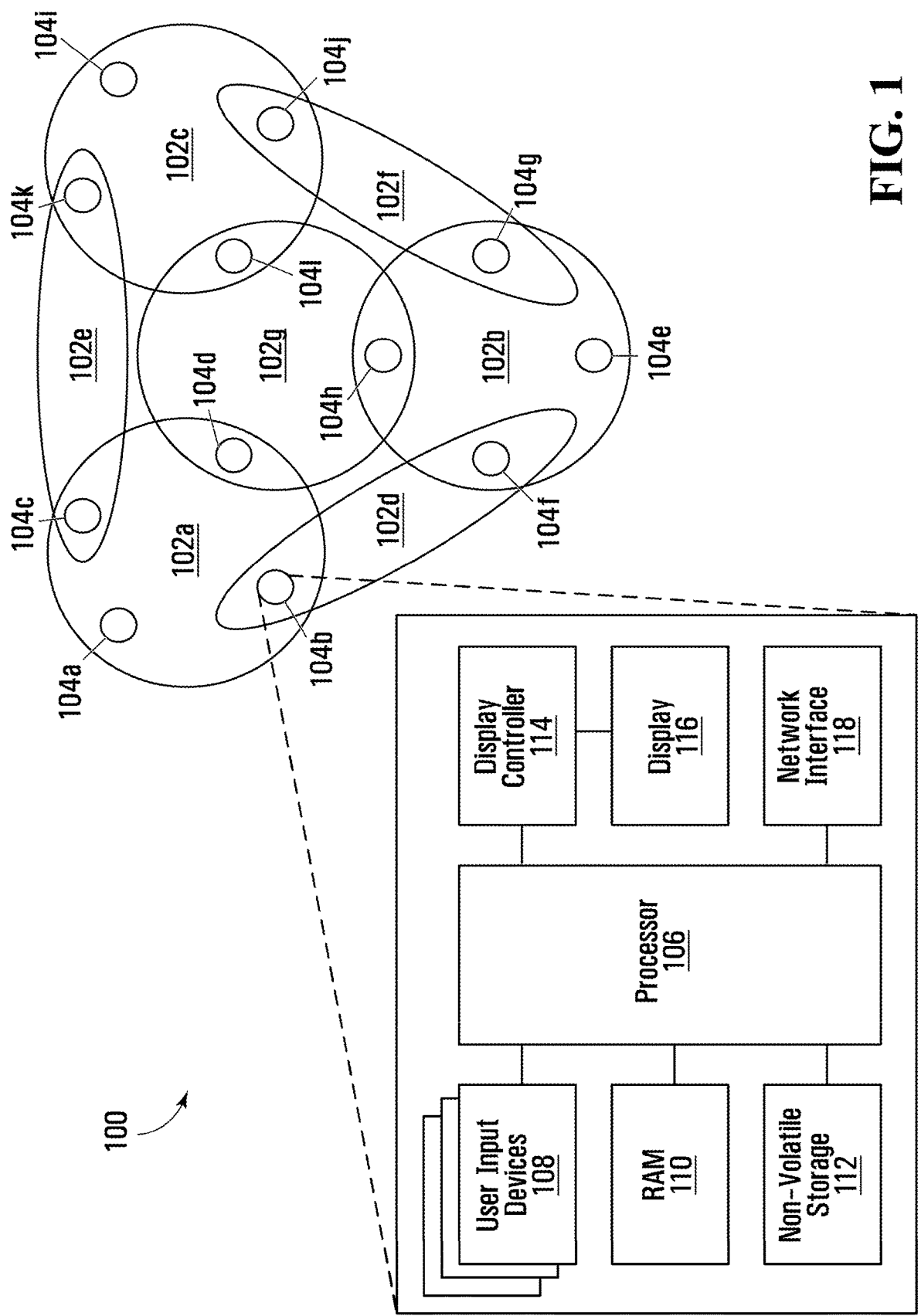
FIG. 1 depicts a system for facilitating data transfer between blockchains, according to one example embodiment.

A blockchain's physical layer comprises computer nodes on which is collectively stored a distributed database. The database is stored as a generally linear chain of "blocks", with each subsequent block in the chain directly linked in a cryptographically secure manner to the immediately preceding block in the chain. New blocks added to the blockchain are referred to as being "higher" in the blockchain than the blocks added to the blockchain prior to it. The first, or lowest, block in the blockchain is referred to as the "genesis block". Because each block in the blockchain is directly linked to its immediately preceding block, any block in the blockchain can, directly or indirectly, be traced back to the genesis block. This is one way in which any one of the nodes can check the validity of the blockchain.

A blockchain can be implemented in a variety of ways. In one example implementation of blockchain used for bitcoin, each block of a blockchain comprises that block's size, in bytes; a block header; a transaction counter, representing the number of different bitcoin transactions stored in that block; and transaction data, which are the stored transactions. In the same example implementation, the block header for each block comprises version information; a previous block hash, which is a reference to the hash of the block immediately preceding that block; a Merkle root, which is a hash of the Merkle tree root of the transactions stored in that block; a timestamp, which is when the block was created; a difficulty target, which is the minimum difficulty that had to be satisfied when performing a proof-of-work operation during block creation; and a nonce, resulting from the proof-of-work.

In a conventional blockchain implementation, different nodes comprising part of the blockchain compete to generate new blocks by performing a proof-of-work operation that satisfies at least the difficulty target specified in each of the new blocks' headers. Once generated, a new block is disseminated to, and its authenticity is independently verified by, other nodes in the blockchain by using the previous block hash (to confirm that new block's lineage) and Merkle root (to confirm the validity of the transactions stored in that new block). Once a new block has been verified, it is added to the top of the blockchain. The blockchain at any given time is typically the chain having blocks resulting from the highest possible cumulative proof-of-work. The nodes are said to have arrived at "consensus" when they agree as to which block is to be added to the top of the blockchain. While the blockchain may fork from time-to-time, resulting in temporarily competing versions of the blockchain, the fact that each block is cryptographically linked to its immediately preceding block means that blocks far from the top of the blockchain are, for practical purposes, immutable.

The distributed and peer-to-peer nature of blockchain described above is also associated with some drawbacks. For example, a byproduct of blockchain's distributed nature is that all nodes comprising part of a blockchain have access to all the data stored on that blockchain, making privacy protection difficult. While certain non-header data on a blockchain may be encrypted, encryption introduces technical overhead and also inhibits what can be done, such as implementing applications as smart contracts, with the data. Furthermore, as a single node scales and is concurrently a node for an increasing number of blockchains, the computational resources required of that node also scale upwards linearly, impeding the ability of that node to efficiently be a member of a high number of blockchains.

The embodiments described herein are described as methods, systems, and techniques to mitigate at least one of the foregoing problems. For example, in at least some of the embodiments described below data may be securely shared between blockchains by a process referred to herein as "chain joining". Using joining, a first blockchain may securely share with a second blockchain a proper subset of non-header data stored on the first blockchain; this is in contrast to being forced to share all of the data stored on the first blockchain, as is required between all the nodes comprising the first blockchain. In at least one of the depicted embodiments herein, the non-header data replaces the transaction data stored on a blockchain when the blockchain is used to implement bitcoin. For example, in at least some of the example embodiments, the non-header data comprises an action that is performed by an application implemented as a smart contract also stored on the blockchain, and data representing the resulting application state that follows from performing that action. Each action in the embodiments depicted herein comprises a JSON object, although in different embodiments an action may comprise a different data structure. Sending, from a first blockchain, the application state data and the action whose performance by the first blockchain results in the application state allows a second blockchain to independently determine whether the state it receives from the first blockchain is accurate.

In at least some example embodiments, the non-header data of a blockchain comprises application data, which is data related to an application stored in the blockchain, such as the applications itself or application state data. For example, in an application configured to store a list of contacts, application state data may comprise a list of those contacts, and a proper subset of application state data may comprise a single entry in that list. In some other example embodiments, the non-header data may not be related to any particular application may comprise a JSON object or binary files.

Furthermore, in at least some of the embodiments described below any one or more nodes may use a hypervisor to virtualize (either fully or using paravirtualization) one or more blockchains while routing system operations through a host controller running on each of those one or more nodes. The host controller may itself be a blockchain ("host blockchain"). The host controller allocates at least some hardware resources of the node on which it runs in response to requests from one or more blockchains running on the hypervisor; each of those chains is referred to interchangeably herein as a "guest blockchain". The host controller performs resource allocation based on, for example, resource availability and task priority. This permits the different blockchains to efficiently share that node's hardware resources, thereby facilitating scaling. Furthermore, in embodiments comprising the host blockchain, the computer program code for at least one of the guest blockchains may be stored in the host blockchain. This permits the host blockchain to store a list of all of those guest blockchains' application state changes, thereby permitting a user to easily to change the state of those applications to any previous state stored in the host blockchain. This may in particular be useful for at least one of debugging and auditing the activities of that node. In embodiments comprising the host blockchain, one or more of the guest blockchains may be stored in the host blockchain, while a different one or more of the guest blockchains may be stored outside of the host blockchain; all guest blockchains may nonetheless have resources allocated for them by the host blockchain, thereby facilitating scalability.

Referring now to FIG. 1, there is shown a system 100 for facilitating data transfer between blockchains, according to one example embodiment. The system 100 comprises first through twelfth nodes 104a-l (generally, "nodes 104"), each of which comprises part of one or more blockchains 102a-g (generally, "blockchains" or "chains" 102). A first blockchain 102a comprises the first through fourth nodes 104a-d; a second blockchain 102b comprises the fifth through eighth nodes 104e-h; and a third blockchain comprises the ninth through twelfth nodes 104i-l.

As discussed in further detail below, the first blockchain 102a is "joined" to a fourth blockchain 102d (via the second node 104b) and to a fifth blockchain 102e (via the third node 104c): this permits all or some of the data stored on the first blockchain 102a to be securely shared with the fourth and fifth blockchains 102d,e, respectively. The second blockchain 102b is analogously joined to the fourth blockchain 102d (via the sixth node 104f) and the sixth blockchain 102f (via the seventh node 104g), and the third blockchain 102c is analogously joined to the sixth blockchain 102f (via the tenth node 104j) and the fifth blockchain 102e (via the eleventh node 104k).

Also as discussed in further detail below, as the fourth blockchain 102d is joined to the first and second blockchains 102a,b, the first and second blockchains 102a,b may read and write data from and to each other via the fourth blockchain 102d. Analogously, the second and third blockchains 102b,c may read and write data from and to each other via the sixth blockchain 102f, and the first and third blockchains 102a,c may read and write data from and to each other via the fifth blockchain 102e. The fourth through sixth blockchains 102d-f are accordingly interchangeably referred to herein as "transfer blockchains" as they facilitate the selective transfer of data between the first through third blockchains 102a-c.

The eighth blockchain 102g in the system 100 is a "directory blockchain" on which is stored data to be freely accessible by the first through third blockchains 102a-c.

While in a conventional bitcoin implementation, generating new blocks comprises applying a proof-of-work, in the depicted embodiments consensus is achieved without applying proof-of-work. For example, the depicted embodiments herein, consensus is determined in accordance with the method as described in the thesis of Ethan Buchman, June 2016, University of Guelph, https://atrium.lib.uoguelph.ca/xmlui/handle/10214/9769. In different embodiments (not depicted), consensus may be determined using proof-of-work, proof-of-stake, or a different method.

The structure of the second node 104b is highlighted in FIG. 1. The other nodes 104a,c-l in the system 100 share analogous structures, although in different embodiments (not depicted) any one or more of the nodes 104 may differ in structure from each other.

Figure 3:
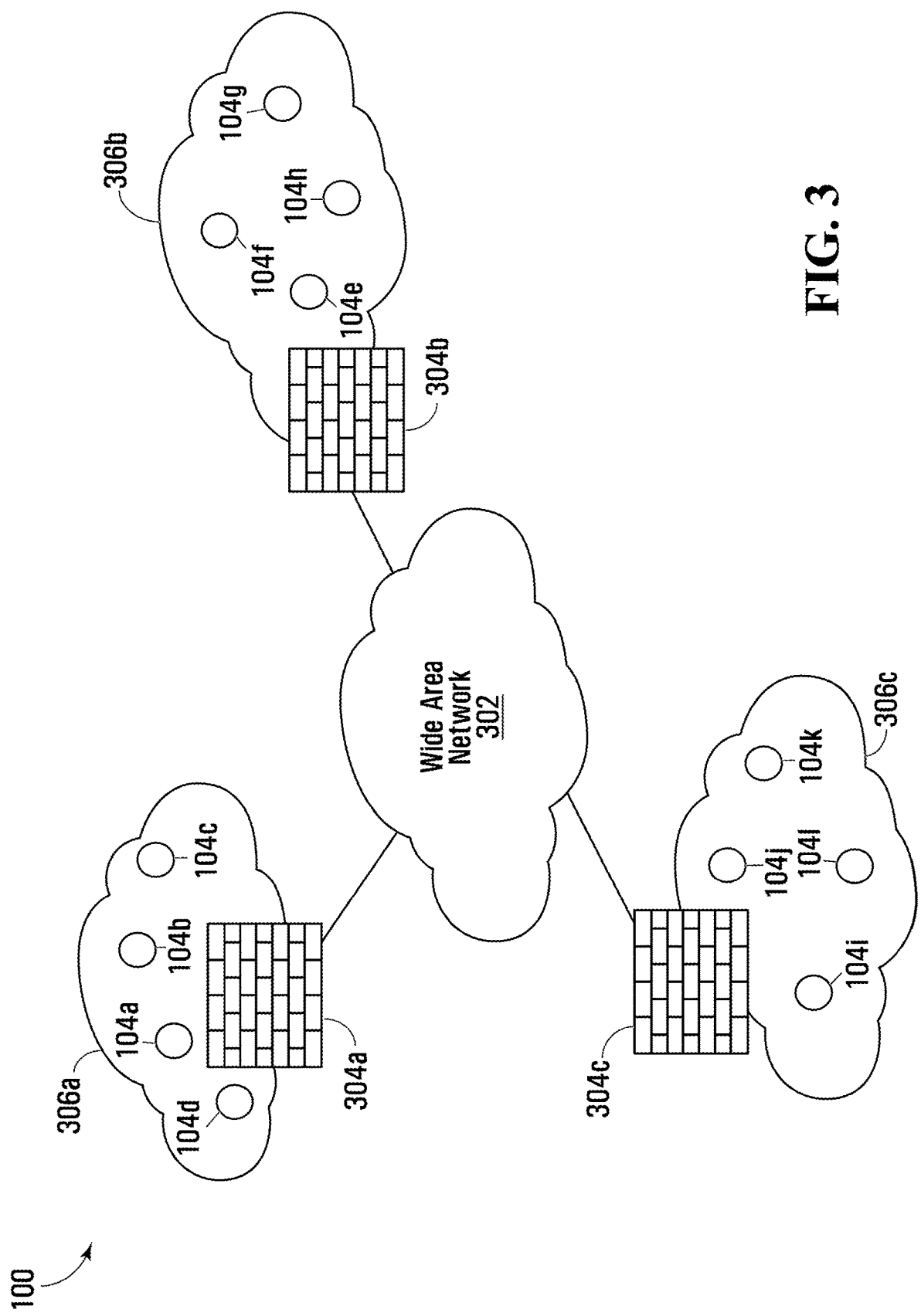
FIG. 3 depicts a physical network topology for the system of FIG. 1.

Referring now to FIG. 3, there is shown a physical network topology for the system 100 of FIG. 1. The system 100 comprises first through third local area networks ("LANs") 306a-c, each protected by a respective firewall 304a-c. The LANs 306a-c are communicatively coupled together via a wide area network ("WAN") 302, such as the Internet. The first through third blockchains 102a-c are respectively local to the first through third LANs 306a-c; each of the fourth through seventh blockchains 102d-g communicate through at least two of the firewalls 304a-c and the WAN 302.

Referring back to FIG. 1, the second node 104b comprises a processor 106 that controls the node's 104b overall operation. The processor 106 is communicatively coupled to and controls several subsystems. These subsystems comprise user input devices 108, which may comprise, for example, any one or more of a keyboard, mouse, touch screen, voice control; random access memory ("RAM") 110, which stores computer program code for execution at runtime by the processor 106; non-volatile storage 112, which stores the computer program code executed by the RAM 110 at runtime and which also stores the blockchains 102a,d of which the second node 104b is a part, as discussed in further detail in respect of FIG. 2; a display controller 114, which is communicatively coupled to and controls a display 116; and a network controller 118, which facilitates network communications with the other nodes 104a,c-l.

Figure 2:
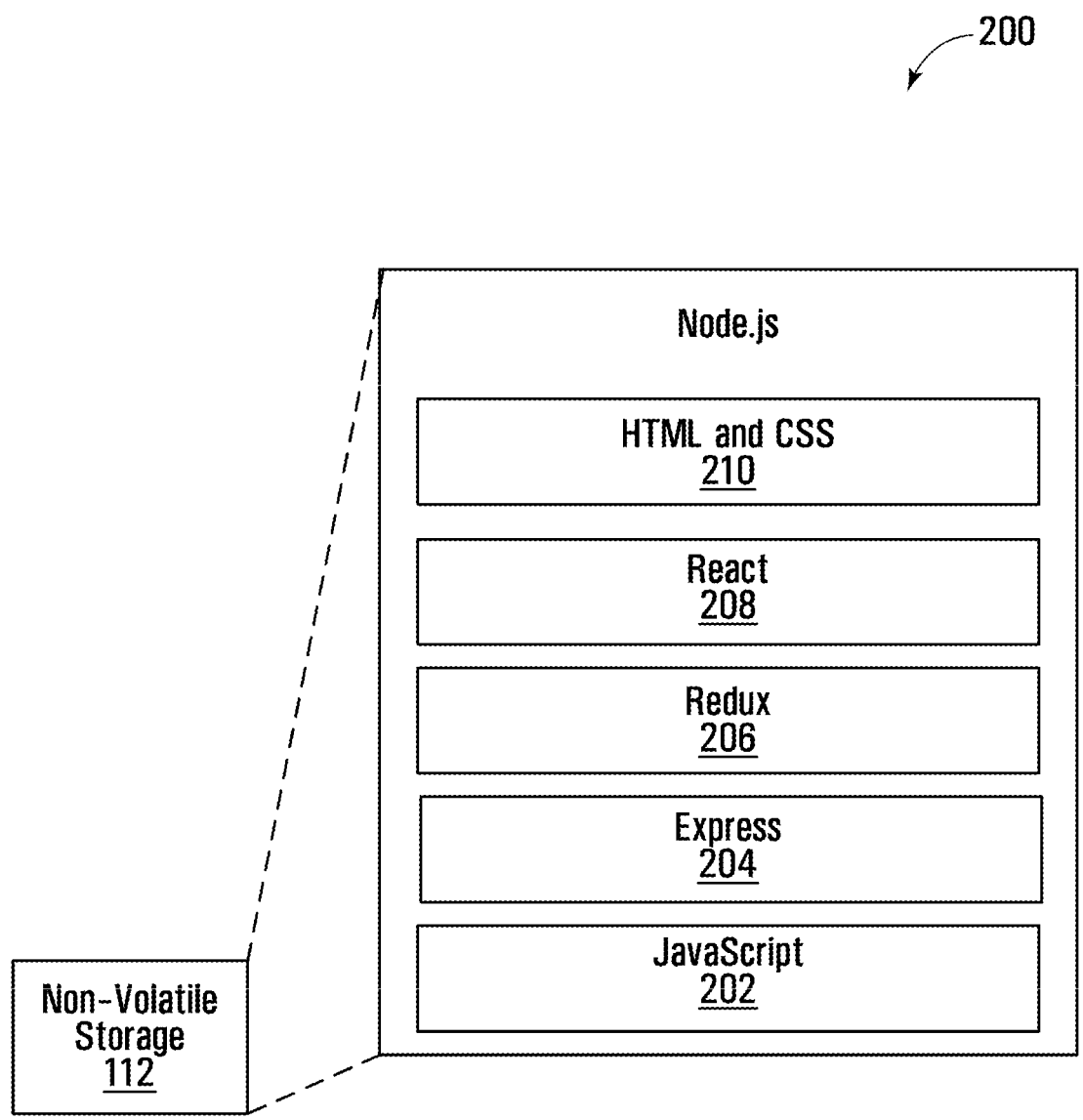
FIG. 2 depicts a software stack comprising part of the system of FIG. 1.

Referring now to FIG. 2, there is shown a software stack 200 comprising part of the system 100 of FIG. 1. The software stack 200 may be expressed as computer program code and stored in the non-volatile storage 112, and the processor 106 may load some or all of that computer program code into the RAM 110 as desired at runtime. The software stack 200 is based on Node.js and accordingly uses JavaScript 202 and, in particular, the JavaScript Express 204, Redux 206, and React 208 libraries. JavaScript 202 is used to implement the blockchain. JavaScript Express 204, Redux 206, React 208, and HTML and CSS 210 are used as a framework for application development. While JavaScript 202 and its associated libraries 204,206,208 are used in this example embodiment, in different example embodiments (not depicted) any one or more of them may not be used for implementation. For example, in certain different embodiments, even if none of the JavaScript Express 204, Redux 206, and React 208 libraries are used, application state may still be tracked using a cryptographically verifiable JSON object.

Figure 4:
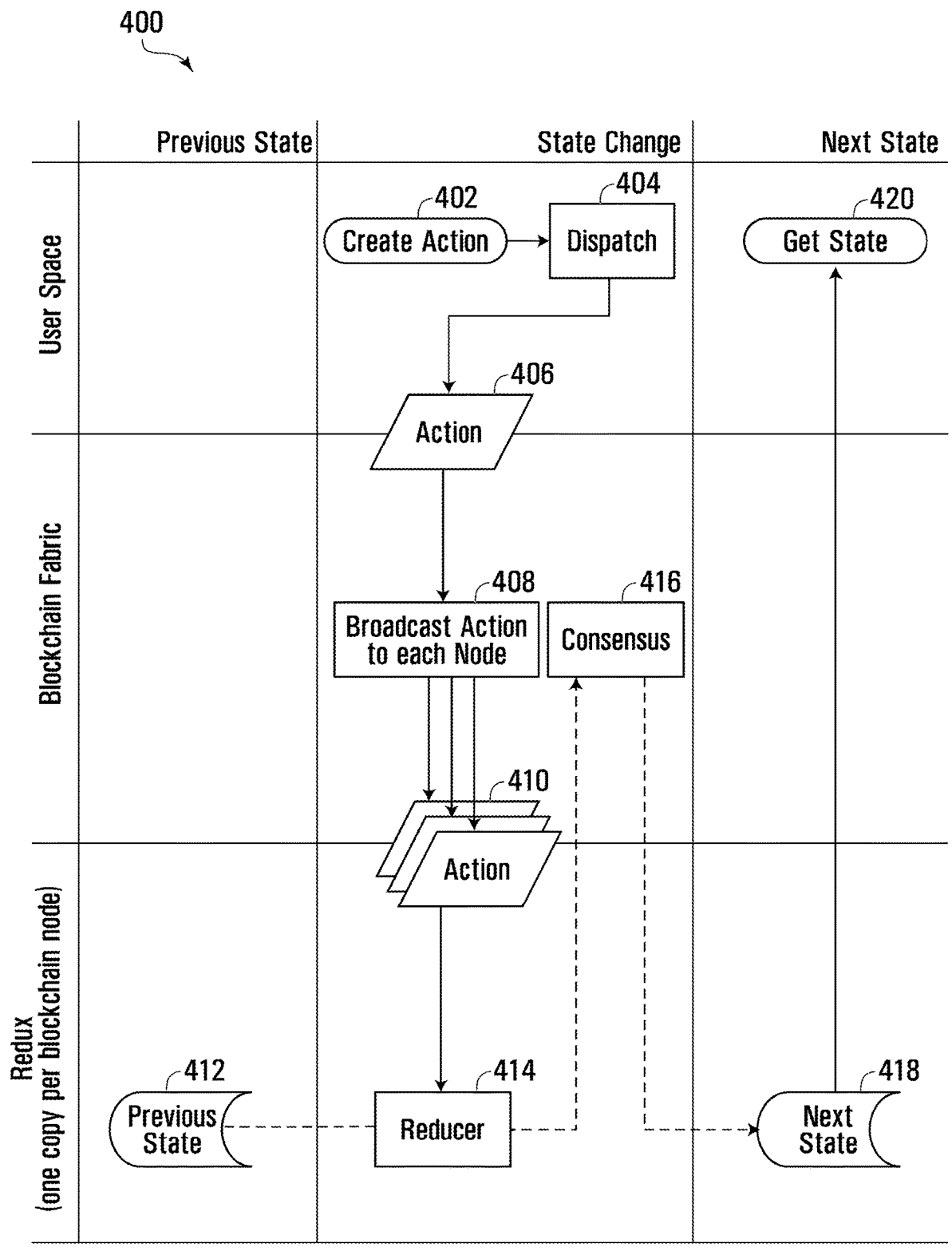
FIG. 4 depicts a flow diagram showing performance of an action to affect system state using a reducer and consensus being achieved for a blockchain, according to the system of FIG. 1.

An application is run as a smart contract on any one of the blockchains 102 in the system 100. FIG. 4 depicts a flow diagram 400 showing performance of an action by the system 100 to affect system state using a reducer and consensus being achieved for any one of the blockchains 102 by applying consensus as described above, according to the system 100 of FIG. 1. In the system 100, a Redux 206 store stores the application's state tree and accordingly is analogous to RAM for the application. An action is created in the user space at block 402, for example in response to user input via one of the user input devices 108, and is dispatched using an asynchronous variant of Redux's 206 dispatch( ) method at block 404 to the blockchain fabric (i.e., automatically to the other nodes 104 comprising the blockchain 102 by virtue of blockchain's peer-to-peer nature). The action transitions from the user space to the blockchain fabric at block 406 and propagates through the nodes 104 comprising the blockchain 102 at block 408. Each of the nodes 104 of the blockchain 102 consequently eventually receives a copy of the action at block 410, and each of the nodes 104 independently evaluates the effect of that action on the current state of the application, which it retrieves at block 412, by performing the action with a reducer at block 414. Once the node 104 performs the action at block 414, the blockchain 102 achieves consensus at block 416 as to the blockchain's 102 next state. The next state that results from that consensus is accepted by the nodes 104 as the correct next state at block 418, and is sent to the user space at block 420.

Figure 8A:
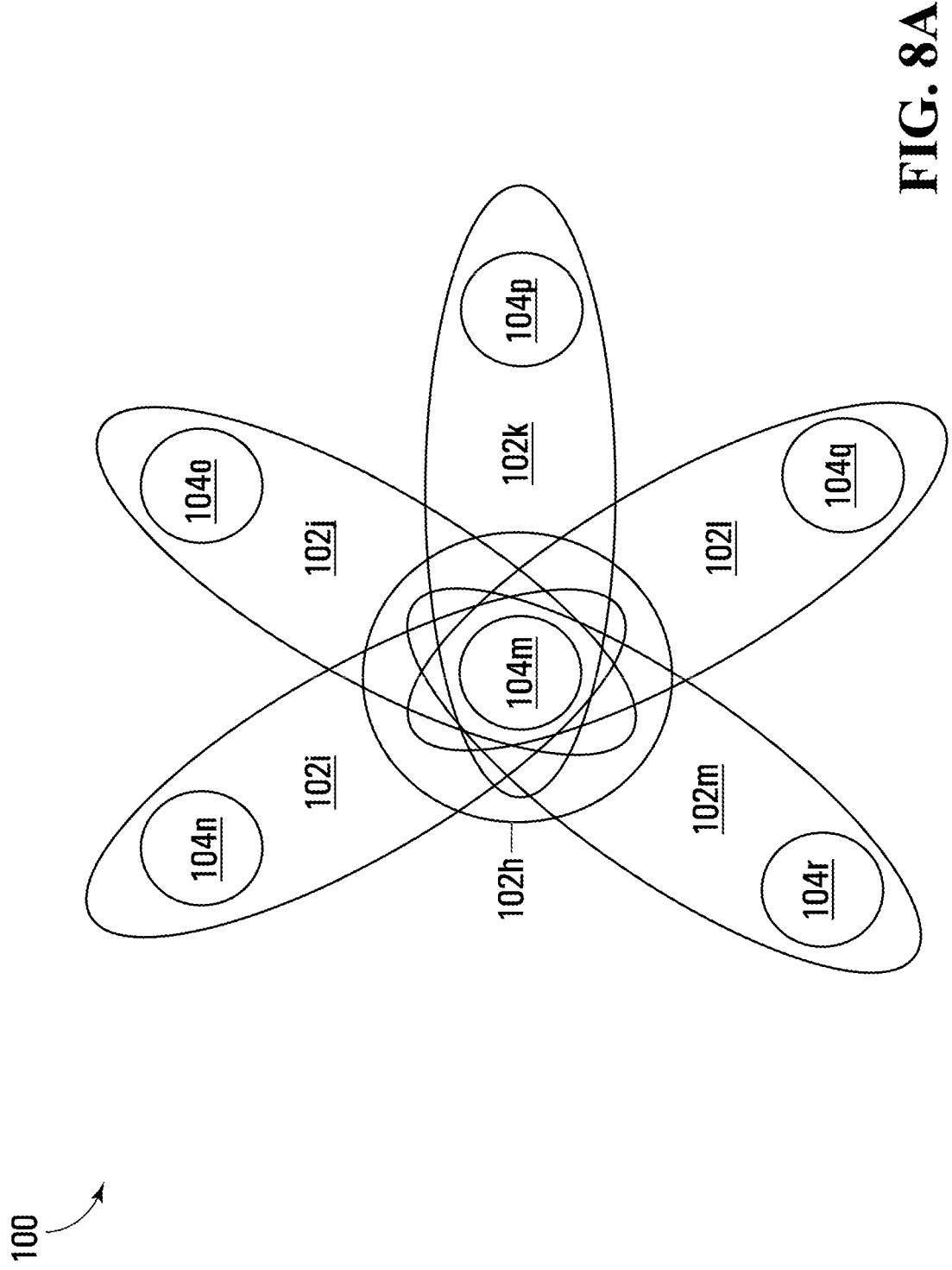
FIG. 8A depicts a system for facilitating data transfer between blockchains, according to another example embodiment.
Figure 8B:
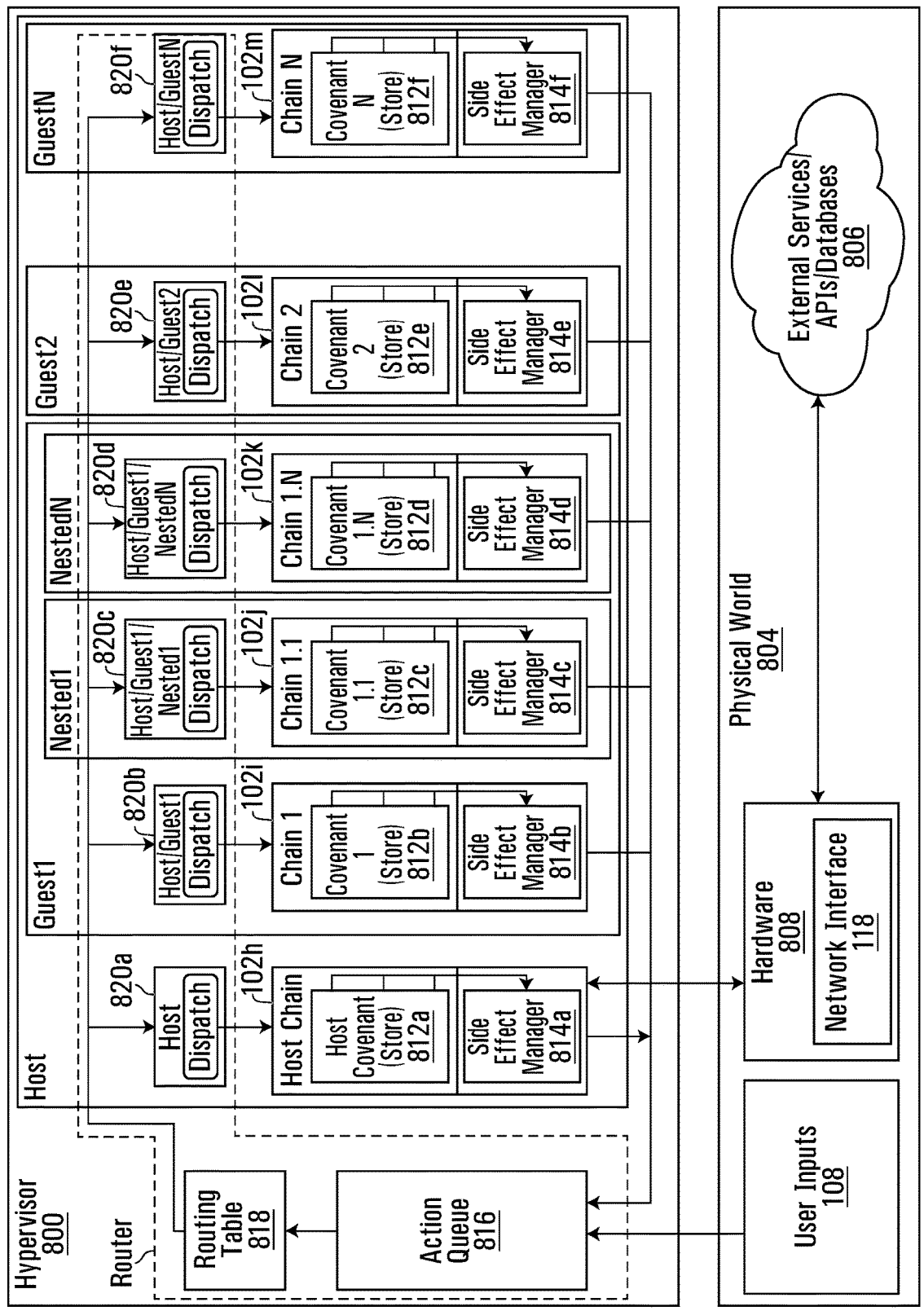
FIG. 8B depicts a block diagram of a hypervisor and the various blockchains running thereon, according to the system of FIG. 8A.

FIG. 8A depicts another example embodiment of the system 100 for facilitating data transfer between blockchains 102. The system 100 of FIG. 8A comprises a thirteenth node 104*m*, which is concurrently a member of six blockchains 102*h-m*: a host blockchain 102*h*, and eighth through twelfth blockchains 102*i-m*. The eighth through twelfth blockchains 102*i-m* also respectively comprise additional nodes 104*n-r*. Each of the blockchains 102*h-m* is paravirtualized on the thirteenth node 104*m*, although in different embodiments (not depicted) the blockchains 102*h-m* may be fully virtualized or, as discussed in further detail below, neither fully virtualized nor paravirtualized. FIG. 8B depicts a hypervisor 800 used for that paravirtualization, and shows the blockchains 102*h-m* running on the hypervisor 800.

In FIG. 8B, the eighth, eleventh, and twelfth blockchains 102*i,l,m* are nested within the host blockchain 102*h*, and the ninth and tenth blockchains 102*j,k* are nested within the eighth blockchain 102*i* (and consequently also within the host blockchain 102*h*). One blockchain 102 is "nested" within another blockchain 102 (the "parent blockchain 102") when the parent blockchain 102 executes an application to create the nested blockchain 102, and when the parent blockchain 102 accordingly can terminate the nested blockchain 102. In the depicted embodiment, the parent and nested blockchains 102 are otherwise equivalent.

The hypervisor 800 interfaces with the physical world 804 via computer hardware responsible for input/output operations ("I/O hardware"), such as the user input devices 108 that provide user input to the hypervisor 800, and disk access and network interface hardware 808 that perform disk access and network communication functions. The hardware 808 interfaces with various third party components 806 such as servers that provide external services, application programming interfaces, and databases.

The hypervisor 800 is implemented in JavaScript 202 and comprises an action queue 816, a router 818, and various operating environments for the blockchains 102*h-m*. The router 818 is communicatively coupled to first through sixth dispatch modules 820*a-f* in series, and the first through sixth dispatch modules 820*a-f* are in turn communicatively coupled to the blockchains 102*h-m*, respectively. The blockchains 102*h-m* each respectively comprises a store 812*a-f* for an application, with each store 812*a-f* effectively acting as RAM for an application on that blockchain 102*h-m*. In at least some example embodiments, an application stored on the blockchain comprises more than a smart contract. For example, an application may comprise a smart contract, which represents a function that returns a value; a saga, which performs actions other than returning a value, such as interactions with hardware; and the actions that interact with the smart contract and the saga. The actions that the saga performs, which are requested using the blockchain and the actual performance of which are performed without the blockchain achieving consensus, are herein referred to as "side effects". While the actual performance of the side effect or action is not subject to consensus, the determination made by the blockchain to perform the side effect is subject to consensus, and the determination made by the blockchain to accept the result of the side effect is also subject to consensus. Each of the applications in the stores 812*a-f* comprises a reducer that performs actions to determine blockchain state. Additionally, side effects, such as interactions between a blockchain 102 and hardware, that may result from the reducer performing that action are handled by side effect managers 814*a-f* for the stores 812*a-f*, respectively.

In one example embodiment, the method of FIG. 4 may be implemented using the hypervisor 800 of FIG. 8B, as follows. A user who creates an action by providing input via one of the user devices 108 generates an action at block 402, which is placed in the action queue 816. The action queue 816 also receives actions from the side effect managers 814*a-f*. The action queue 816 eventually dispatches the user generated action to the router 818, which routes it to the blockchains 102*i-m* relevant to that action; for the purposes of this example, the eighth blockchain 102*i* is the only blockchain 102 affected by the action. The router 818 routes the action directly to the third dispatch module 820*c*. This corresponds to block 406 in FIG. 4. The host blockchain 102*h* captures the action as soon as it is converted from hardware to an action; the I/O hardware (whether the user input device 108 or hardware 808) interacts with the host blockchain 102*h* and the action is consequently recorded in the host blockchain 102*h* before the action is even sent to the action queue 816. The router 818 routes actions in the action queue 816 to the appropriate dispatch module 812*a-f*. The router 818 sends actions to any given one of the chains 102*i-m* in the order in which those actions are placed in the action queue 816; however actions for different blockchains 102*i-m* may be sent to the dispatch modules 812*a-f* for those blockchains 102*i-m* out of order. For example, if the action queue 816 receives a first action for the eighth blockchain 102*i*, then a second action for the ninth blockchain 102*j*, and then a third action again for the eighth blockchain 102*i*, the router 818 may send the first and third actions to the eighth blockchain 102*i* before sending the second action to the ninth blockchain 102*j*. However, the router may not send the third action to the eighth blockchain 102*i* before the first action.

Once the action arrives at the eighth blockchain 102*i*, the thirteenth node 104*m* broadcasts the action to any other nodes 104 comprising part of that blockchain 102*i*, which as shown in FIG. 8A comprises the additional node 104*n*; this corresponds to blocks 408 and 410 in FIG. 4. The thirteenth node 104*m* communicates via the host blockchain 102*h*, which interfaces with the disk access and network interface hardware 808 as necessary to communicate with that additional node 104*n*. The additional node 104*n* eventually receives and performs the action at its reducer at block 414. Back at the thirteenth node 104*m*, the reducer comprising part of the second store 812*b* performs the action, and again via the host blockchain 102*h* shares the new state it determines to the additional node 104*n*. The eighth blockchain 102*i* eventually reaches consensus, which corresponds to block 416 of FIG. 4, with communication involving the node 104*m* on which the hypervisor 800 runs occurring again via the host blockchain 102*h*. Once consensus is reached, the eighth blockchain 102*i* settles on its new state at block 418, and relays this new state to the user again via the host blockchain 102*h* via the user input hardware 108, which corresponds to block 420.

A side effect in the form of a hardware operation may be required when a reducer performs an action. Any hardware operation is performed by the hypervisor 800 in response to an instruction from the host blockchain 108*h*; the host blockchain 108*h* consequently is aware of and records all hardware operations and related actions in its blocks. The host blockchain 108*h* also records the result of performing that action, which is the new application state for the blockchain 102 that received the action. Each blockchain 108 also returns a "success" or "failure" indicator after an action is performed, indicating whether the action was successfully performed, which the host blockchain 108*h* also records. A side effect performed on behalf of a guest blockchain is performed such that it is isolated to that guest blockchain so as to prevent potential corruption of the rest of the system 100 (e.g., other guest blockchains); a side effect performed on behalf of a guest blockchain is accordingly sandboxed to that guest blockchain and away from the remainder of the system 100. A side effect that the hypervisor 800 performs on behalf of the host blockchain 102*h* (e.g., a system level function is isolated not to a particular guest blockchain but rather by the physical limits of the node 104*m*. Examples of system level functions in at least some example embodiments comprise disk access and/or network access via the disk access and network interface hardware 808, access to multiple cores or threads of the processor 106, user input/output via the user input devices 108, and secure cryptographic key storage.

The host blockchain 102*h* effects creation, by virtue of the hypervisor 800 performing a side effect of the host blockchain 102*h*, of each block to be added to any of the guest blockchains. In the course of performing that side effect, the hypervisor 800 prepares each new block for the guest blockchains in an isolated environment such that the computational results of block creation are limited to the guest blockchain for which that new block is being created; this prevents potential corruption of the rest of the system 100 (e.g., other guest blockchains). New block creation performed on behalf of a guest blockchain is accordingly sandboxed to that guest blockchain and away from the remainder of the system 100. The host blockchain 102*h* similarly instructs the hypervisor 800 to create the new blocks that are to be added to the host blockchain 102*h*. However, creation of the new blocks for the host blockchain 102*h* itself is isolated not to a particular guest blockchain but rather by the physical limits of the node 104*m*. Accordingly, new block creation for the host blockchain 102*h* has the potential to affect operation of the host blockchain 102*h* and all guest blockchains hosted on the node 104*m*. As discussed in further detail below, a new block that undergoes consensus and that is added to any of the blockchains is a type of data structure referred to herein as a "heavy block". A heavy block is created from time to time, such as every 2 s, and comprises committing the block to the non-volatile storage 112 and distributing the block to a blockchain's nodes 104. Also as discussed further below, between creating heavy blocks the hypervisor 800 creates another type of data structure referred to herein as a "light block", each of which comprises a collection of actions and is created without performing relatively resource heavy tasks associated with heavy block creation, such as hashing, consensus, committing to the non-volatile storage 112, and distribution to a blockchain's nodes 104. Instead, light blocks remain in a node's 104 volatile storage, such as the RAM 110. Light blocks are made more frequently than heavy blocks, such as on the order of every few milliseconds. As used herein, a reference to creating a new "block" for a blockchain is a reference to a new heavy block unless otherwise indicated.

Following creation of a new block for a guest blockchain, that guest blockchain subjects the new block to consensus and, only after a sufficient number of nodes 104 comprising the guest blockchain vote in favor of consensus (e.g., at least ⅔ of those nodes+1 additional node), is that new block added to that guest blockchain. In contrast, as the host blockchain 102*h* consists of only a single node 104*m*, consensus by multiple nodes is not done to approve a new block for the host blockchain 102*h*. Rather, in at least some example embodiments the host blockchain 102*h* confirms that the new block is properly formatted and, if properly formatted, the new block passes consensus and is added to the host blockchain 102*h*. For example, a new block may be "properly formatted" if it comprises lineage verification data, validity verification data, and non-header data, as described further below in respect of chain joining; further, the new block may additionally specify the identity of the node 104*m* on which the hypervisor 800 runs. In at least some example embodiments, the identity of the node is the chainID of the host blockchain 102*h*.

In the depicted example embodiment, the host blockchain 108*h* also monitors and handles resource allocation for compute operations (operations that do not use the I/O hardware but that do require the node's 104*m* processor) that satisfy at least one of a processor time and processor intensity threshold. This permits the host blockchain 108*h* to allocate and store processor resources for particularly computationally intensive tasks, such as certain cryptographic tasks.

While in FIGS. 8A and 8B the thirteenth node 104*m* is described as communicating with the additional nodes 104*n-r* via the disk access and network interface hardware 808, in different embodiments (not depicted) communication may be between blockchains 102 that are hosted on the same node 104 and even running on the same hypervisor 800. In those example embodiments, communication between blockchains 102 can be done with lower latency and a lower transmission time than when communication need be done through the hardware 808.

The applications on the blockchains 102*h-m* are configured such that all hardware interactions with any of the blockchains 102*i-m* occur via the host blockchain 102*h*. For example, all network communications, which occur via the disk access and network interface hardware 808, and user interactions, which occur via the user input devices 108, are performed by the eighth through twelfth blockchains 102*i-m* via the host blockchain 102*h*. The host blockchain 108*h* accordingly is configured to interact with all hardware as instructed by any of the blockchains 108*i-m* nested therein. The host blockchain 102*h* records in its blocks all hardware operations (requests and responses, and user inputs conveyed via hardware) and application states of the applications running on each of those nested blockchains 102*i-m*. In some different embodiments (not depicted), the host blockchain 102*h* may record some and not all of the operations involving the I/O hardware. The host blockchain 102*h* also records all actions that are routed to the blockchains 102*i-m* at least by virtue of those actions being routed through the router 818 and, if those actions require I/O hardware usage, by virtue of that as well. This permits a user access to the entire state history and hardware operations of all of those nested blockchains 102*i-m*. That user accordingly is able to revert to a previous application state of any of the blockchains 102*i-m* and adjust the order of actions in the action queue 816 to simulate how the hypervisor 800 and blockchains 102*i-m* would have reacted had the actions arrived in a different order than the original order they were in fact received; in one example use case, this is done when an application throws a fault. This permits the system 100 to be thoroughly tested by virtue of allowing simulation of different timing errors that the system 100 may experience. The blocks of each of the nested blockchains 102*i-m* for a subset of the data contained within the blocks of the host blockchain 102*h*. During debugging or testing, a user may select any action from the action queue 816 for routing to the blockchains 102*i-m* via the router 818, regardless of the order in which the action queue 818 received the actions. The input/output operations are made to be procedural and deterministic; consequently, the hardware responds to an action in the same manner regardless of when it receives that action, which facilitates changing the order of actions during debugging or testing.

Another node may connect to the host blockchain 108*h*, and the reverting of the application to an earlier state may be done in response to input from that other node. This other node may, for example, be that of a third provider providing technical support.

While the depicted example embodiment shows the blockchains 102*h-m* as paravirtualized on the hypervisor 800, in different embodiments (not depicted) neither fully virtualization nor paravirtualization need be used. In some of those different embodiments, some of the nodes 104 fully virtualize or paravirtualize the blockchains 102*h-m* using the hypervisor 800 while others do not. Additionally, in some of those different embodiments in which at least one of the nodes 104 uses the hypervisor 800 for fully virtualization or paravirtualization, some or all of the blockchains 102*h-m* may be fully virtualized or paravirtualized. For example, while the flow diagram 400 of FIG. 4 may be implemented using the hypervisor 800 of FIG. 8B, in different embodiments (not depicted) virtualization need not be used for its implementation.

Chain Joining

While all of the nodes 104 on any given one of the blockchains 102 have access to all the data stored on the blockchain 102, different blockchains 102 do not by default share data between each other. The method of chain joining, described below, permits data to be shared between different blockchains 102.

Figure 5A:
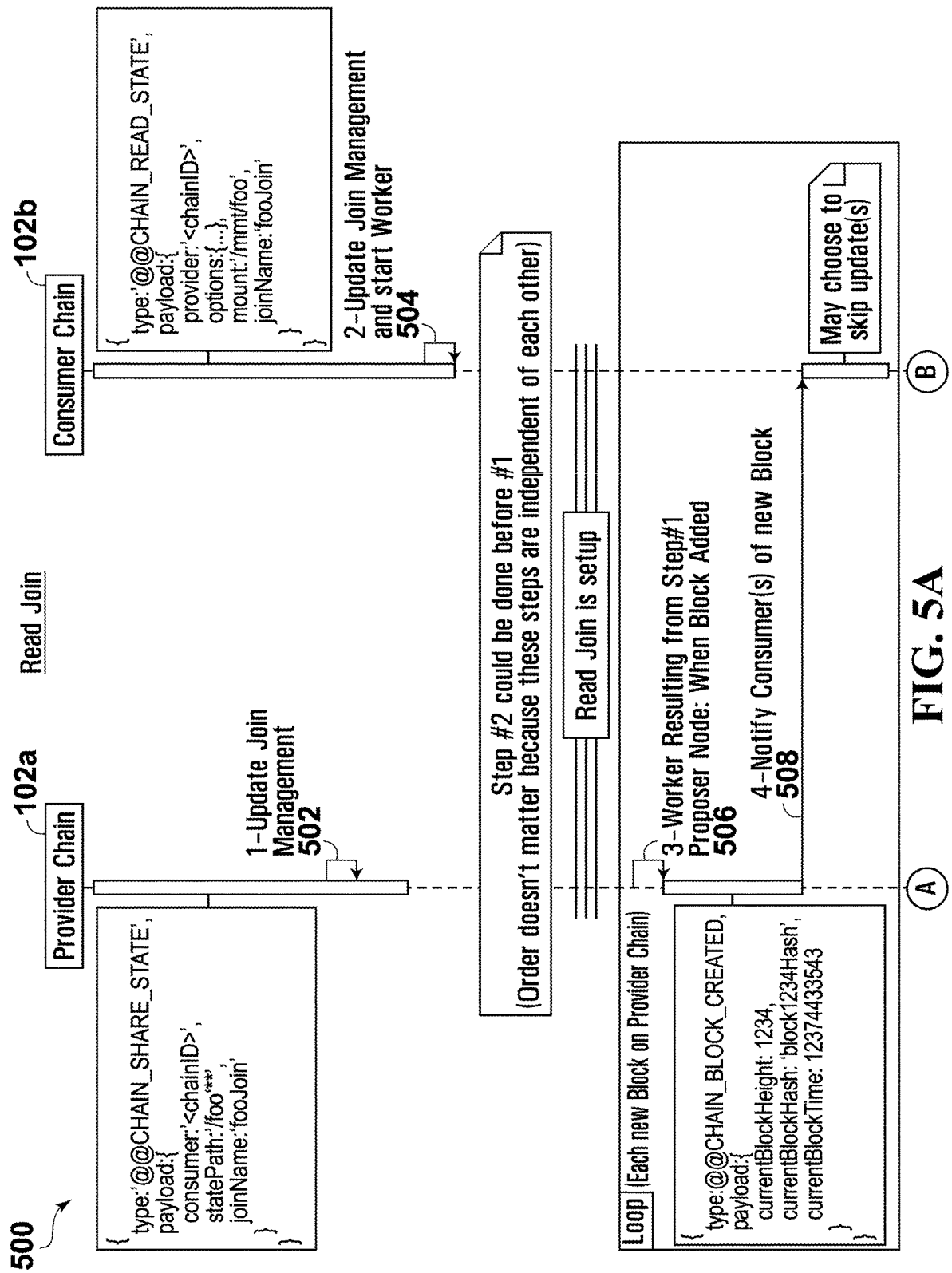
FIGS. 5A and 5B depict a UML sequence diagram showing how two blockchains perform a read join, according to the system of FIG. 1.
Figure 5B:
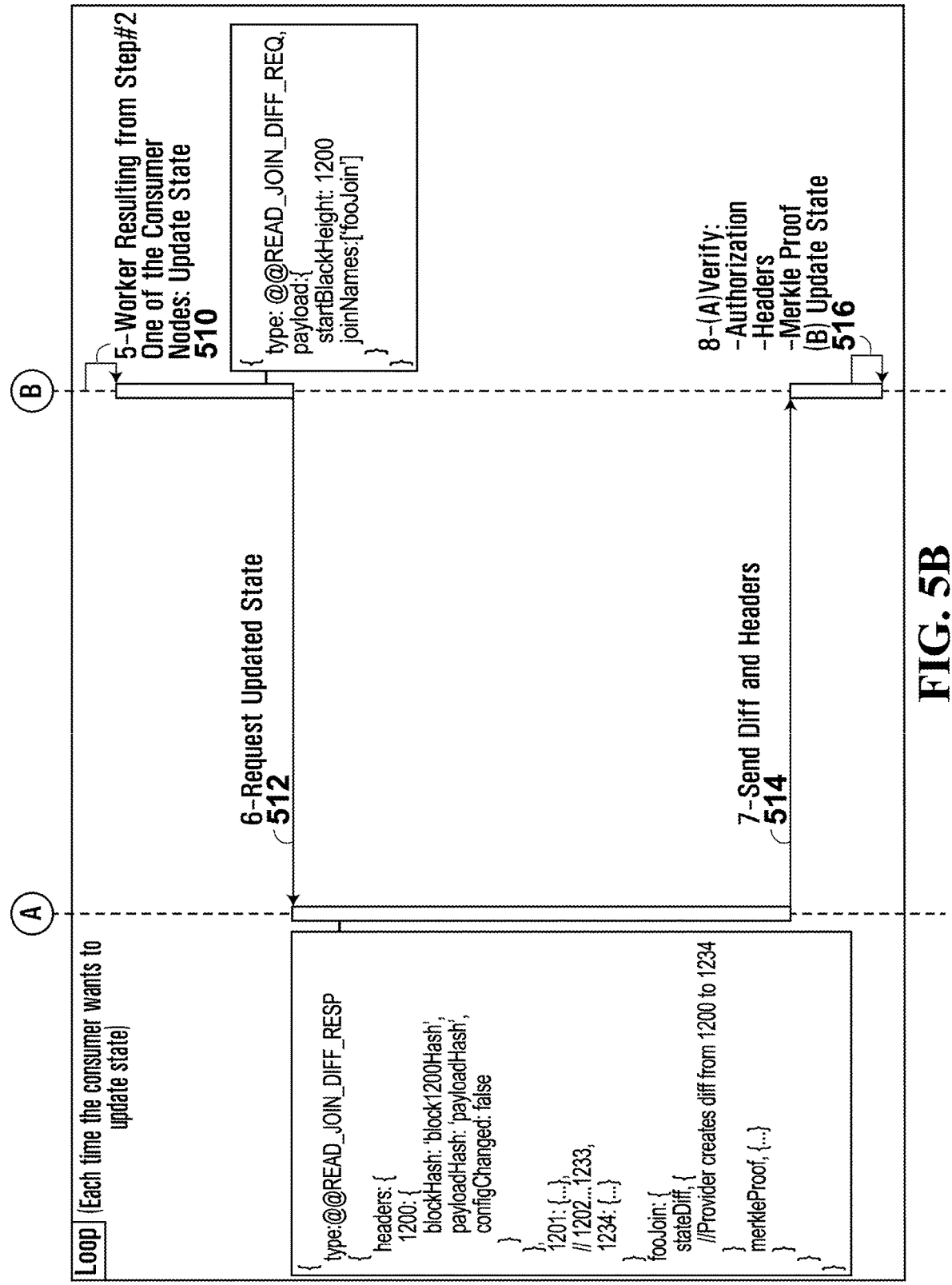

FIGS. 5A and 5B depict a UML sequence diagram 500 showing how two blockchains 102*a,b* perform a read join, according to the system 100 of FIG. 1. While the first and second blockchains 102*a,b* are used in the diagram 500, a read join may be performed between any two blockchains 102. For example, while the first and second blockchains 102*a,b* do not share any nodes 104, a read join may be performed between blockchains 102 that share nodes 104 and, in some example embodiments, that are virtualized (fully or paravirtualized) on at least some of the same nodes 104 using, for example, the hypervisor 800.

In the diagram 500, the second blockchain 102*b* reads data from the first blockchain 102*a*; for the purposes of the diagram 500, the second blockchain 102*b* is accordingly interchangeably referred to as the "consumer chain 102*b*" and the first blockchain is accordingly interchangeably referred to as the "provider chain 102*a*".

At operation 502, the provider chain 102*a* updates its join management routine. A user commences this by providing input via one of the user input devices 108 of one of the nodes 104*a-d* comprising the provider chain 102*a*. The user input is dispatched as an action ("@@CHAIN_SHARE_STATE") by the router 818 to the provider chain 102*a* on that node 104 for performance by that chain's 102*a* reducer. The action's payload is digitally signed so that it is cryptographically verifiable (i.e., any tampering can be detected). The action's payload comprises a chain identifier of the consumer chain 102*b* ("<chainID>"), a path identifying the proper subset of the state data of the provider chain 102*a* to be read by the consumer chain 102*b* ("statePath: '/foo/'"), and an alias identifying this particular chain join ("joinName: 'fooJoin'"). In the diagram 500, the state information available to the provider chain 102*a* is represented using a directory tree. The root of the tree having path "/" represents all the state data available to the provider chain 102*a*; and subdirectories, such as "/foo/", represent a proper subset or "slice" of that state data.

The chain identifier is unique and is generating by digitally signing a value comprising the provider chain's 102*a* genesis block modified to contain a random seed. The random seed ensures uniqueness. At any time during the read join, the provider chain 102*a* may confirm the identity of the consumer chain 102*b* using the chain identifier and only send the slice of state data to the consumer chain 102*b* when the attempt to confirm that identity is successful.

At operation 504, the same or a different user provides input via one of the user input devices 108 of one of the nodes 104*e-h* comprising the consumer chain 102*b*. The user input is dispatched as an action ("@@CHAIN_READ_STATE") by the router 818 to the consumer chain 102*b* on that node 104 for performance by that chain's 102*b* reducer. The action's payload is a cryptographically secure chain identifier of the provider chain 102*a* ("<chain ID>"), a path identifying where the state data is to be stored ("mount: '/mnt/foo'", with the state data that is read by the consumer chain 102*b* is stored using the model of a mounted filesystem), an alias identifying this particular chain join ("joinName: 'fooJoin'"), and various options for the read join. Example options comprise a data age limit, which requires data being transmitted via the read join to be less than a certain age to be usable for all or some actions; a frequency threshold, which defines how quickly the read join is to repeat to update the state data on the consumer chain 102*b*; and a maximum size limit, which sets a flag if the data transmitted by the read join exceeds a maximum limit.

Once operations 502 and 504 have been performed, the read join is initialized. Operations 502 and 504 may be performed concurrently or one of the operations 502,504 may be performed before the other of the operations 502, 504.

Once the read join is initialized, the provider chain 102*a* enters into a loop comprising operations 506 and 508 that it performs for each block on the chain 102*a*. An action ("@@CHAIN_BLOCK_CREATED") is generated each time a new block is added to the provider chain 102*a*. New block creation comprises the provider chain 102*a* application deciding to create a block, which triggers a side effect, which when the hypervisor 800 is used is handled by the side effect manager 814. The action's payload is the block height for that new block ("currentBlockHeight: 1234"), the hash of that new block's header ("currentBlockHash: block1234Hash"), and a timestamp identifying when that block was created ("currentBlockTime: 12374433543"). In some example embodiments, the timestamp is omitted. At operation 508, the provider chain 102*a* sends an update in the form of the @@CHAIN_BLOCK_CREATED action to the consumer chain 102*b*, notifying the consumer chain 102*b* that a new block has been created. The update comprises the height and header hash of that new block. The consumer chain 102*b* may choose to accept and receive a copy of the slice of the state data stored by the newly created block, or skip the update.

When the consumer chain 102*b* chooses to receive an update from the provider chain 102*a*, operations 510, 512, 514, and 516 are performed for each update. At block 510, the consumer chain 102*b* generates an action ("@@READ_JOIN_DIFF_REQ") having a payload of the starting block height of the provider chain 102*a* for which the data transfer is to begin ("startBlockHeight: 1200"), which the consumer chain 102*b* knows from operation 504 (the last time it was set) and which the consumer chain 102*b* will update at operation 516 as discussed below; a hash of the header of the block at the starting block height (not shown in FIG. 5B) and the alias for the join ("joinNames: [fooJoin]"). At operation 512, the consumer chain 102*b* requests the updated slice of state data from the provider chain 102*a* by sending the @@READ_JOIN_DIF_REQ action to the provider chain 102*a*.

In response to the request, the provider chain 102*a* performs an action ("@@READ_JOIN_DIFF_RESP") to generate the response to the request. In response to the action, the provider chain 102*a* retrieves a header for each of the blocks (regardless of whether a slice of state data is sent from that block, as the headers are used to verify lineage) (blocks 1200 to 1234). Each header comprises a hash of the header of the immediately preceding block in the chain 102*a* ("previousBlockHash: 'block1199Hash'"); a hash of that block's entire application state, even though only a slice of that state data is to be transmitted ("payloadHash: 'payloadHash'"); a sufficient number of digital signatures of the nodes of the first blockchain to establish that consensus was reached for that block; and a flag indicating whether an aspect of the chain configuration has changed (i.e., when an aspect that affects the ability to verify block lineage changes), such as when an encryption method (e.g., the type of hash) has changed, when the list of nodes that is entitled to vote for consensus changes, when the digital signature(s) used changes, and when header format changes ("configChanged: false"). The action also generates a hash of the block header ("blockHash: 'block1200Hash'"), which does not comprise part of the header itself. The chain 102*a* also determines a difference in the state data from the starting block height (1200) to the current block height (1234) ("stateDiff: {//Provider creates diff from 1200 to 1234}"), so as to avoid sending unnecessary data to the consumer chain 102*b*. The provider chain 102*a* also determines a Merkle proof ("merkleProof"), which comprises one or more hash values selected to permit the consumer chain 102*b* to determine a Merkle path from a hash of the application data sent to the second blockchain to a Merkle root, which in this example is in the payloadHash field. The provider chain 102*a* sends the data generated in response to the @@READ_JOIN_DIFF_RESP action to the consumer chain 102*b* at operation 514.

In this example embodiment, the hash of the application data is a Merkle root and comprises all actions used to make the block and the last state resulting from the application performing all of those actions in order. In a different example embodiment, the block may store each state that results from performing each of the actions, or a subset of those states. For each block being transmitted, the hash of that block and of the header of a block immediately below that block, the hash of that block's application data, and the hash of the digital signatures collectively represent one example of lineage verification data that the consumer chain 102*b* may use to verify the lineage of that block back to the genesis block of the chain.

In this example embodiment, the merkleProof field is one example of validity verification data, which permits the consumer chain 102*b* to verify validity of the application data it receives from the provider chain 102*a*. While Merkle trees are used in this example, Merkle trees are only one example form of cryptographic proof. Other possible ways exist. The proof mechanism allows a single root hash, and a series of other hashes used in some structure, to allow verification of a piece of data by relating it back to the root hash without disclosing any of the other data that was not intended to be shared. Other data structures that may be used, for example, comprise Patricia Trees, Radix Trees, and chunked concatenations.

The consumer chain 102*b* subsequently verifies the authenticity of the data it receives at operation 516. More specifically, it verifies the transmitted block's lineage using the lineage verification data, the validity of the proper subset of state data it received using the validity verification data, and adds a new block to the consumer chain 102*b*. More specifically, the consumer chain 102*b* verifies the provider chain's 102*a* digital signature; verifies each transmitted block's lineage using the hashed header information; checks the validity of the transmitted state data using the data's Merkle tree; verifies the type of consensus method used, which may be changed using the configChange field as described above; verifies that a sufficient number of nodes 104 have contributed to the consensus of the block by checking the signatures of the nodes that voted in favor of consensus; and verifies the cryptographic validity of the block in accordance with the cryptographic method used by the chain 102*a*.

The consumer chain 102*b* then updates the mounted directory where it stores state information (/mnt/foo), which itself comprises the consumer chain 102*b* adding a new block to itself with the non-header data of that new block comprising the data received from the provider chain 102*a* (i.e., the lineage verification data, proper subset of state data, and validity verification data).

In summary, the read join permits a user of the consumer chain 102b to read a slice of state data stored on the provider chain 102a as though that data were mounted locally on the consumer chain 102b.

Figure 6:
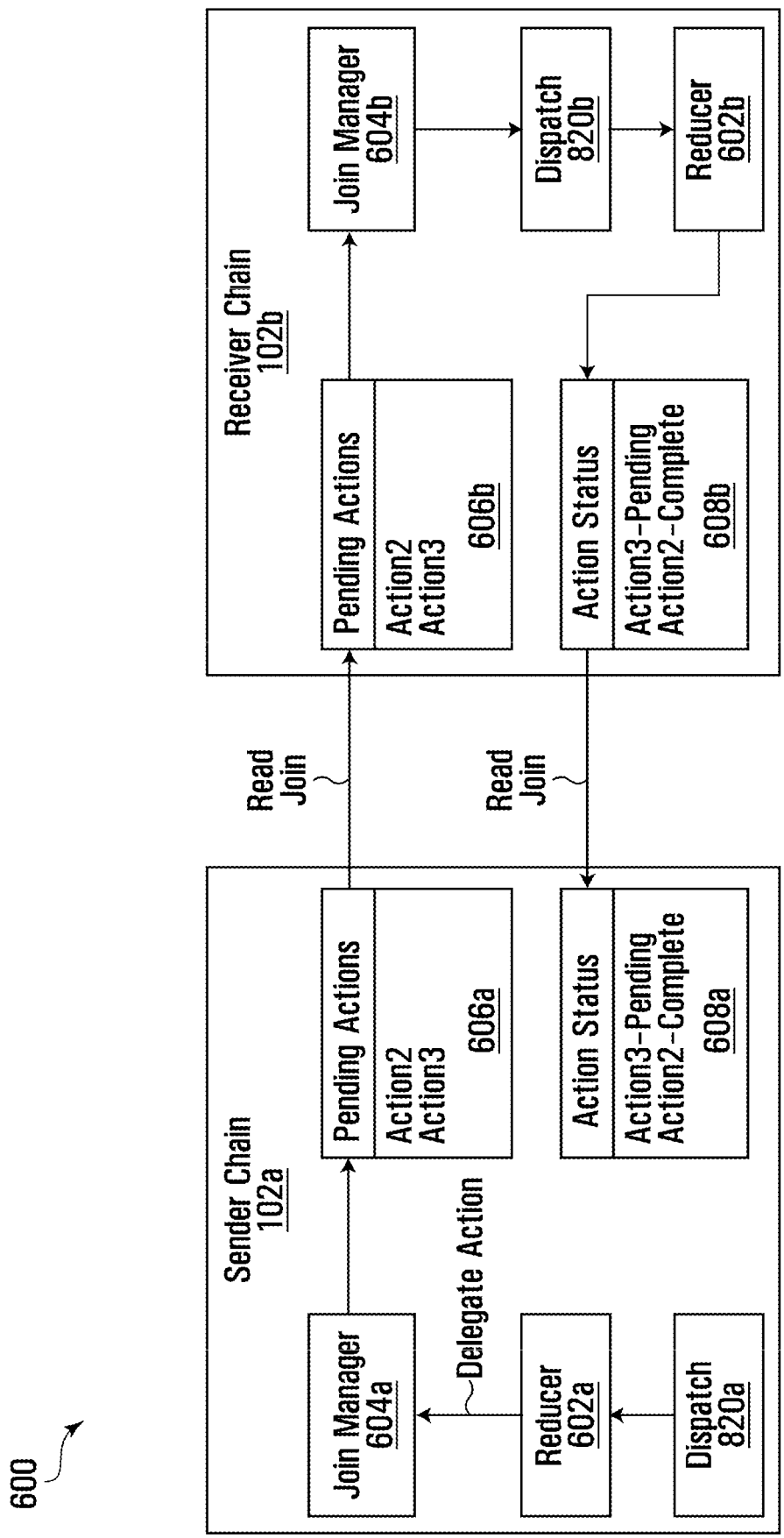
FIG. 6 depicts a block diagram showing how two blockchains perform a write join, according to the system of FIG. 1.

Referring now to FIG. 6, there is depicted a block diagram 600 showing how two blockchains perform a write join, according to the system 100 of FIG. 1. As with FIGS. 5A and 5B, while the first and second blockchains 102a,b are used in the example of FIG. 6, a write join may be performed between any two blockchains 102 regardless of whether they have overlapping nodes 104 and regardless of whether any nodes are virtualizing chains using the hypervisor 800. In FIG. 6, the first blockchain 102a writes data to the second blockchain 102b; the first blockchain 102a is accordingly interchangeably referred to as the "sender chain" 102a and the second blockchain 102b is accordingly interchangeably referred to as the "receiver chain" 102b.

The sender chain 102a comprises a dispatch module 820a, which dispatches actions to a reducer 602a. As discussed in further detail below in respect of FIGS. 7A to 7C, the reducer 602a delegates performance of certain actions to a join manager 604b, which controls which actions are queued in a pending actions queue 606a for transmission to the receiver chain 102b. The actions are sent to the receiver chain 102b via a read join. The sender chain 102a also comprises an action status queue 608a that reads, via a read join, a list of which actions have been completed by the receiver chain 102b.

The receiver chain 102b analogously comprises a pending actions queue 606b that receives the actions via the read join from the sender chain's 102a pending actions queue 606a. The received actions are sent to a join manager 604b, which forwards them to a dispatch module 820b and updates an action status queue 608b to indicate that the action is pending. The dispatch module 820b forwards those actions to a reducer 602b, which performs them, thereby changing the receiver chain's 102b state data and performing a write operation. The join manager 604b also, after the reducer 602b performs the action, updates the action status queue 608b to indicate that the action has been completed. The statuses in the action status queue 608b are sent to the sender chain's 102a action status queue via a read join. The write join of FIG. 6 accordingly is implemented using two read joins.

Figure 7A:
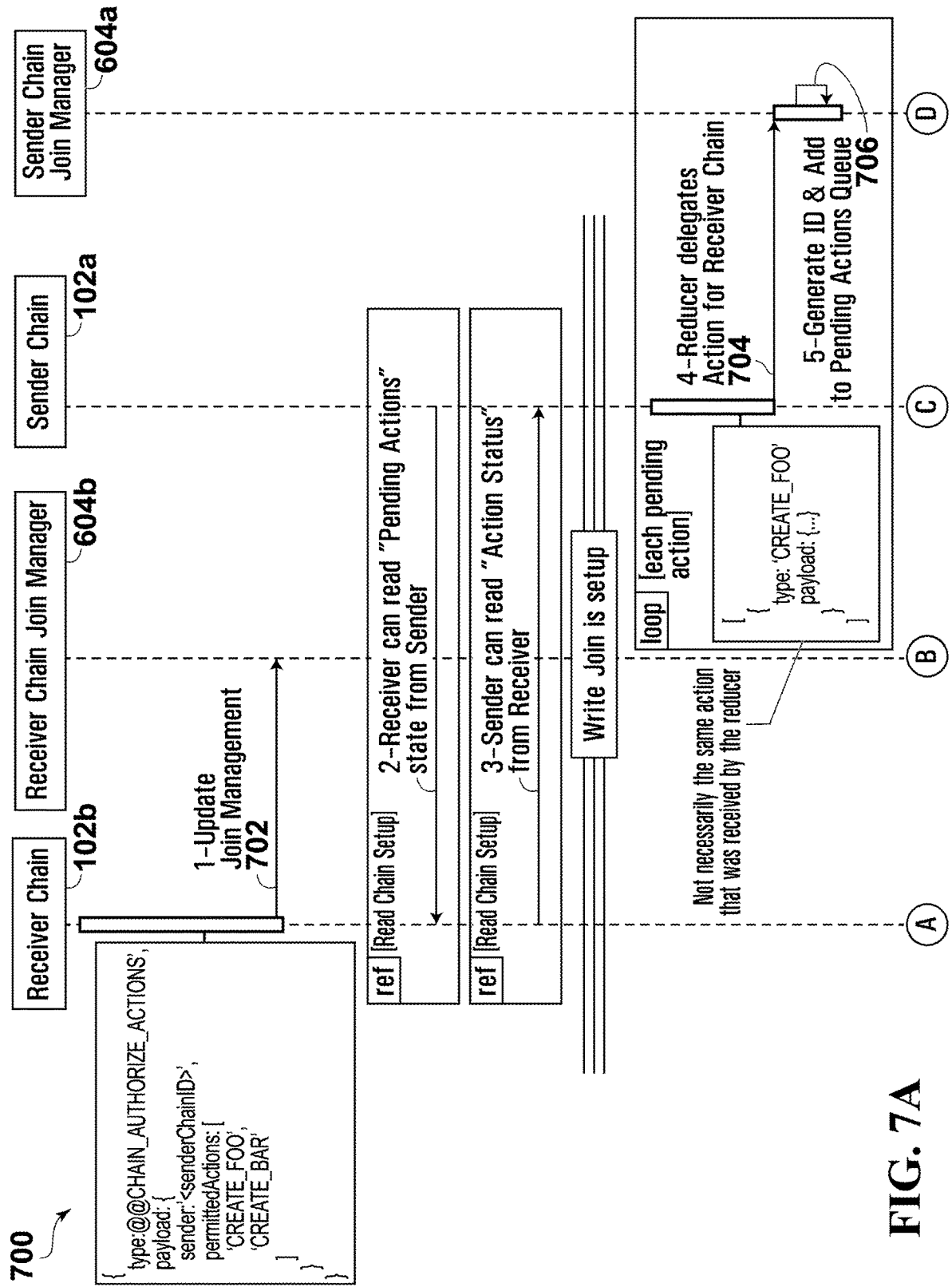
FIGS. 7A to 7C depict a UML sequence diagram showing how two blockchains perform a write join, according to the block diagram of FIG. 6.
Figure 7B:
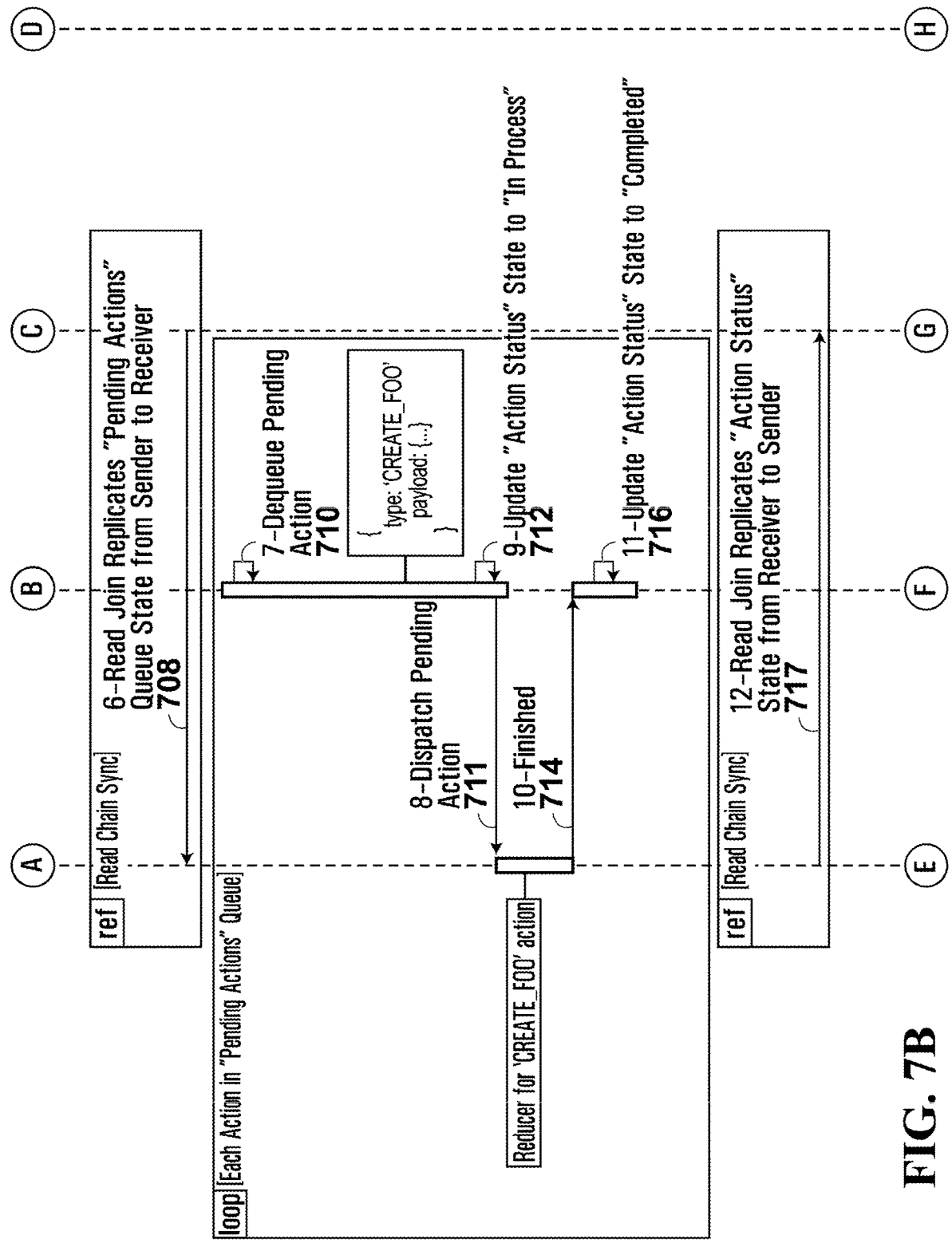
Figure 7C:
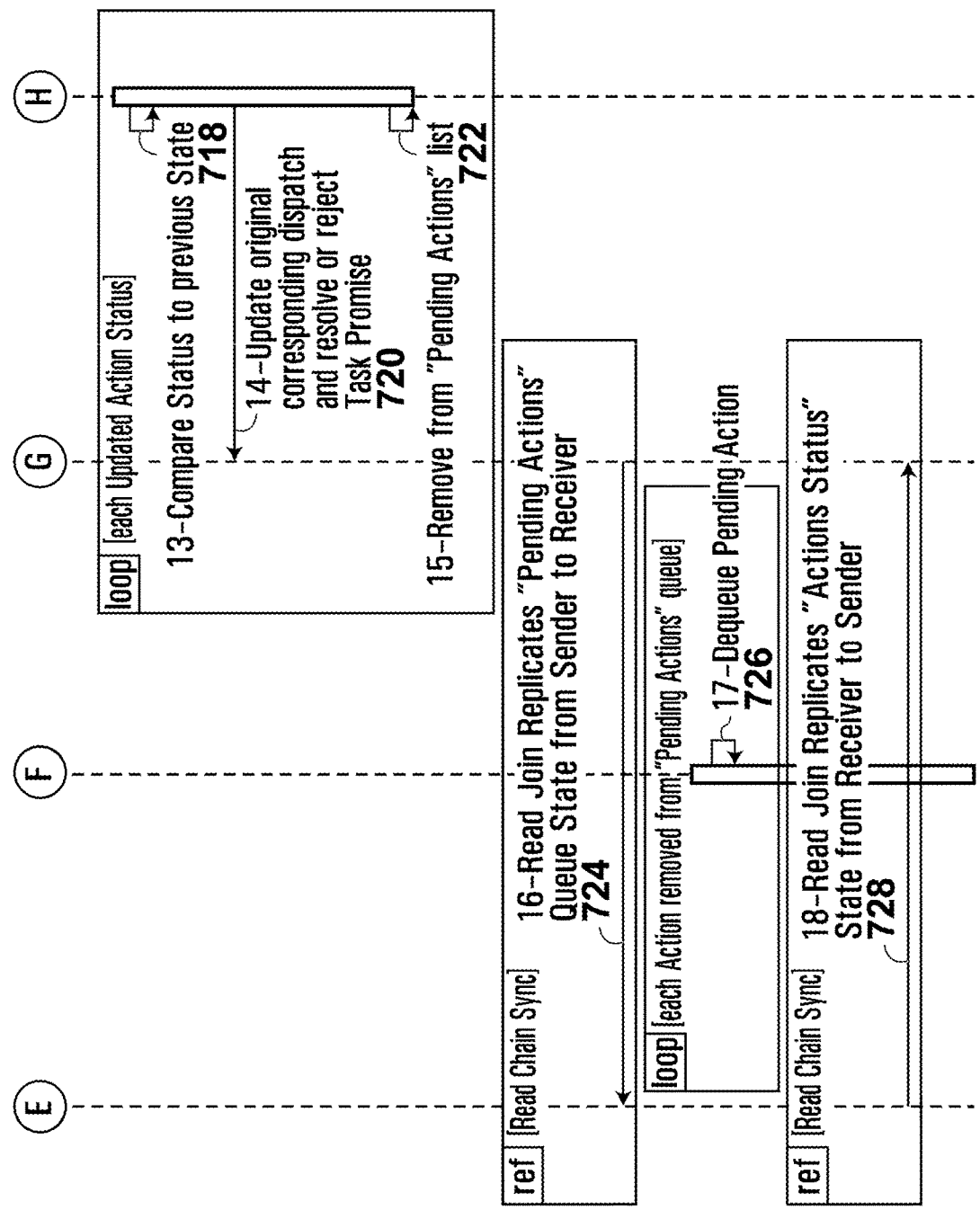

FIGS. 7A to 7C depict a UML sequence diagram 700 showing how two blockchains 102a,b perform a write join, according to the block diagram 600 system of FIG. 6. The objects in the diagram are the sender and receiver chains 102a,b, the sender chain's 102b join manager 604a, and the receiver chain's 102b join manager 604b. While the join managers 604a,b are shown as being objects distinct from the chains 102a,b, this is done for convenience only and the managers 604a,b comprise part of the application logic performed by the chains 102a,b.

At operation 702, the receiver chain's 102b join manager 604b performs an action ("@@CHAIN_AUTHORIZE_ACTIONS") having a payload comprising a cryptographically secure chain identifier identifying the sender chain 102a ("sender: <senderChainID>") and enumerating the actions that the sender chain 102a is permitted to have the receiver chain 102b perform ("permittedActions: ['CREATE_FOO'; 'CREATE_BAR']"). The cryptographically secure chain identifier is generated in a manner analogous to the chain identifiers for FIG. 5A. Following this, the receiver chain's 102b pending actions queue 606b is able to read actions from the sender chain's 102a pending actions queue 606a, and the sender chain's 102a action status queue 608a is able to read the status of actions from the receiver chain's 102b action status queue 608b. After the queues 606a,b and 608a,b are able to communicate, the write join is setup. In the depicted embodiment, the sender chain 102a is by default authorized to perform certain actions received from the receiver chain 102b, so authorization is not explicitly shown in FIGS. 7A to 7C.

For each action the sender chain 102a wishes to send to the receiver chain 102, the sender chain 102a performs operations 704 and 706. For each action, the sender chain 102a creates an action of one of the permitted enumerated types ("type: 'CREATE_FOO'"). The action created by the reducer 602a may or may not be identical to the action that was dispatched to it. The reducer 602a then delegates the action at operation 704 to the join manager 604a, following which the join manager 604a generates an identifier for that action and places it in the pending actions queue 606a at operation 706. That action is transmitted, via a read join, from the sender chain's 102a pending actions queue 606a to the receiver chain's 102b pending actions queue 606b at operation 708.

In order to make efficient use of the overhead accompanying each read join, such as that required for cryptographic checks and consensus, multiple actions may be queued in the sender chain's 102a pending actions queue 606a and transmitted via a single read join.

For each action that the receiver chain 102b receives, it performs operations 710, 711, 712, 714, and 716. At operation 710, the receiver chain's 102b join manager 604b removes the pending action from the pending actions queue 606b, dispatches the action to the reducer 602b at operation 711, and updates the action status queue 608b to indicate that the action is in process. The reducer 602b performs the action, informs the join manager 604b at operation 714, and the join manager 604b updates the action status queue 608b to indicate that the action is completed at operation 716.

At operation 717, the sender chain's 102a action status queue 608a is updated to correspond to the receiver chain's 102b action status queue 608b via a read join.

For each updated action status, the sender chain 102a performs operations 718, 720, and 722. At operation 718, the join manager 604a compares the action's status in the action status queue 608a to the action's previous status. At operation 720 it updates the dispatch that originally dispatched the action to the reducer 602a, returning to the user any information that is to be returned following completion of the action (e.g., a notification to the user indicating that the action has been completed). The join manager 604a then removes the completed action from the pending actions queue 606a at operation 722.

At operation 724, the pending action queues 606a,b of the chains 102a,b are synchronized using a read join, following which the receiver chain's 102b join manager 604b removes the action from the pending action queue 606b (operation 726). After the action is removed, the action status queues 608a,b are synchronized using a read join at operation 728.

The sender chain 102a receives actions from the receiver chain 102b via read joins that the action is pending at the receiver chain 102b (operation 717) and that the action has been performed by the receiver chain 102b (operation 728). For each read join, the sender chain 102a also receives lineage verification data and validity verification data analogous to that described above for FIGS. 5A and 5B.

The diagrams 500,700 of FIGS. 5A-7C depict actions being transmitted between chains 102. Although not expressly illustrated in those figures, each action is sent in a block for which the first chain 102 has reached consensus, so that a second chain 102, which receives the action, can verify that the action in fact comes from the first chain and has not been tampered with.

Hyperconvergence

In at least some example embodiments, the host blockchain 102h may effectively engage in chain joining with one or both of 1) one or more additional host blockchains running on one or more different computer nodes 104, and 2) one or more guest blockchains, whether hosted on the same node 104m as the host blockchain 102h or any different computer nodes 104. As described in respect of FIGS. 9 and 10 below, this allows the host blockchain 102h to be controlled by and/or to otherwise share information with one or both of 1) those one or more additional host blockchains and 2) those one or more guest blockchains. Each of those host and guest blockchains accordingly may access the system level functions of the node 104m that the host blockchain 102h controls by specifically instructing the host blockchain 102h to perform those functions. Additionally or alternatively, each of those host and guest blockchains accordingly may otherwise share information with the host blockchain 102h, such as information pertinent to disk sharding or network connectivity as described further below. In contrast, in embodiments in which an additional host blockchain on another node 104 cannot effectively chain join with the host blockchain 102h running on the thirteenth node 104m, that additional host blockchain is unable to specifically instruct the host blockchain 102h on the thirteenth node 104m to perform system level functions or otherwise directly share information with the host blockchain 102h. Similarly, in embodiments in which a guest blockchain, whether on the thirteenth node 104m or another of the nodes 104, is unable to effectively chain join with the host blockchain 104h, the guest blockchain is unable to directly share information with the host blockchain 102h and the operations that guest blockchain are able to perform are isolated to its user space. The guest blockchain consequently cannot directly call system level functions using the host blockchain 102h.

Figure 9:
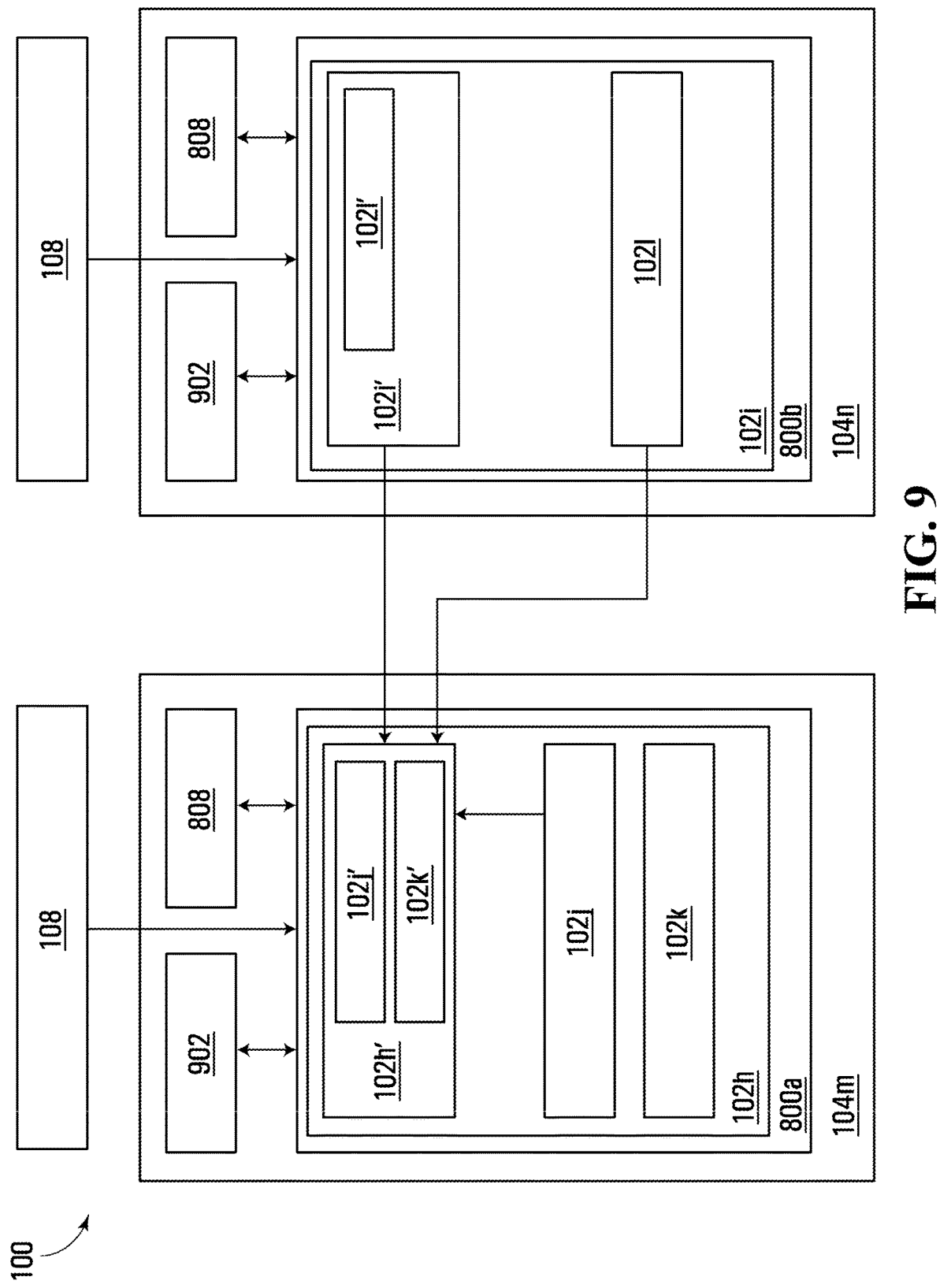
FIG. 9 depicts a block diagram of a hyperconvergent system, according to another example embodiment.
Figure 10:
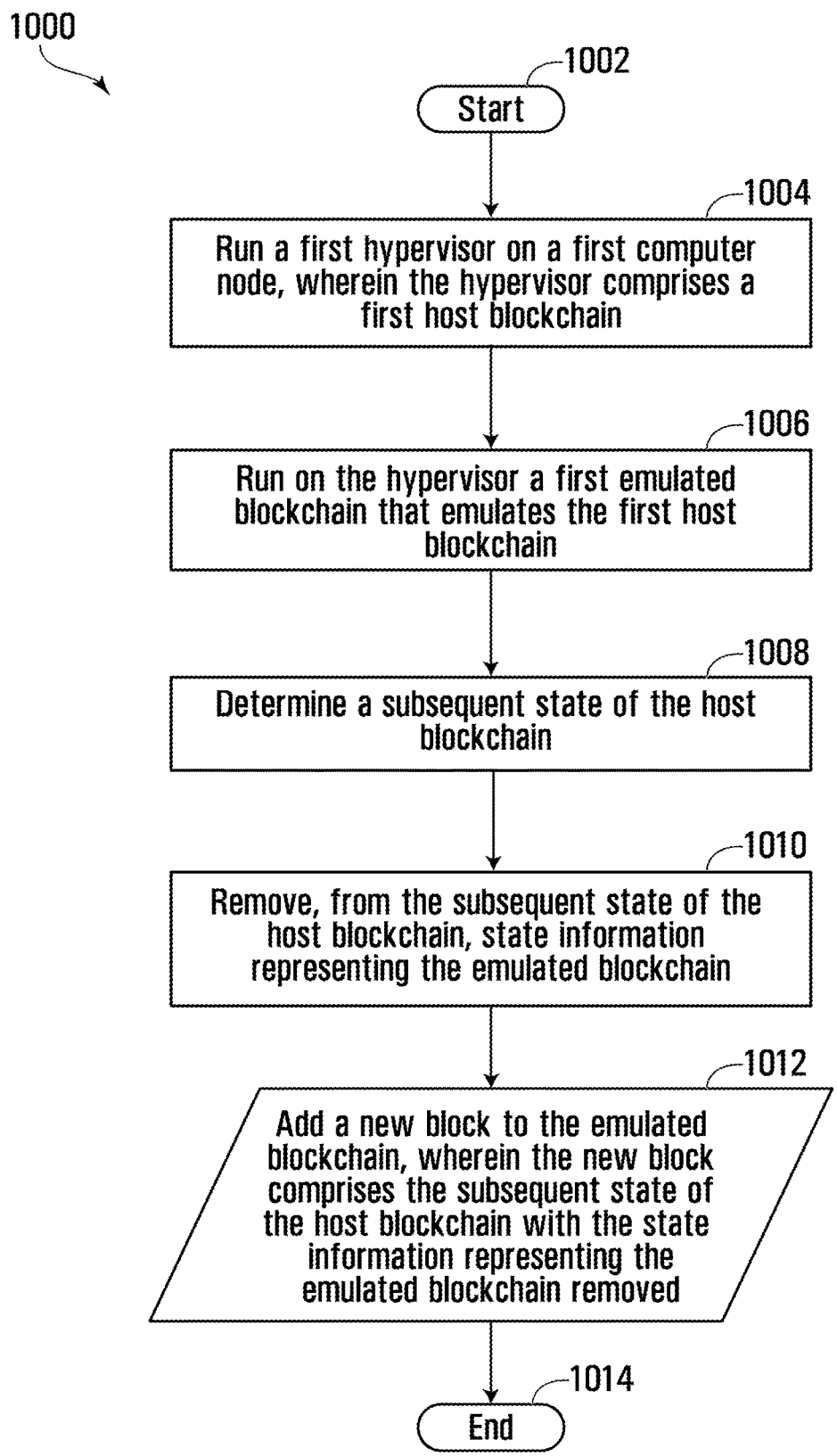
FIG. 10 depicts a method for adding a new block to an emulated blockchain comprising part of the hyperconvergent system of FIG. 9, according to another example embodiment.

In the embodiments described in respect of FIGS. 9 and 10, the ability for a joining blockchain to directly call a system level function using the host blockchain 102h and/or to otherwise share information with the host blockchain 102h permits the system 100 to be "hyperconvergent". The hardware functions such as network and disk access that are spread across the system's 100 nodes 104 can accordingly be software-controlled by any host blockchain or guest blockchain on any of the nodes 104, thereby virtualizing those hardware functions. More particularly, in at least some example embodiments, each of multiple nodes comprises an emulated blockchain that emulates the host blockchain on that node. That emulated blockchain can chain join, as described above, with other guest blockchains (whether on the same or other nodes) and/or with emulated blockchains on other nodes 104. A host blockchain may then retrieve and perform the actions received by its corresponding emulated blockchain.

FIGS. 9 and 10 respectively depict an example of the system 100 that is hyperconvergent and an example method 1000 for adding a new block to an emulated blockchain comprising part of the hyperconvergent system 100 of FIG. 9. FIG. 9 depicts a pair of computer nodes 104m,n: the thirteenth computer node 104m and one of the additional nodes 104n-r, the fourteenth node 104n. The thirteenth computer node 104m runs a first hypervisor 800a, which comprises a first host blockchain 102h (i.e., the first hypervisor 800a runs the first host blockchain 102h). Similarly, the fourteenth computer node 104n runs a second hypervisor 800b, and a second host blockchain 102j runs on the second hypervisor 800b. The first and second host blockchains 102h,i run a first emulated blockchain 102h' and a second emulated blockchain 102i', which emulate the first host blockchain 102h and the second host blockchain 102i, respectively, as discussed further below in respect of FIG. 10. In addition to the first emulated blockchain 102h', the first host blockchain 102h also runs the ninth and tenth blockchains 102j,k as guest blockchains, and the second host blockchain 102i also runs the eleventh blockchain 102l as a guest blockchain. The first emulated blockchain 102h' comprises emulated versions of the ninth and tenth blockchains 102j,k (these are the "emulated ninth and tenth blockchains 102j',k'" or the "emulated guest blockchains 102j',k'"), and the second emulated blockchain 102i' comprises an emulated version of the eleventh blockchain 102l (this is the "emulated eleventh blockchain 102l'" or the "emulated guest blockchain 102l'"). In order to conserve memory and to prevent state data from unnecessarily being shared across the nodes 104 that host the emulated blockchains 102h',i', in at least some example embodiments the emulated ninth through eleventh blockchains 102j'-l' comprise a last state of the interfaces of the ninth through eleventh blockchains 102j-l, respectively, and may omit some or all of the additional data comprising the ninth through eleventh blockchains 102j-l. For example, the interface of each emulated blockchain 102j'-l' may comprise the last state of the pending action queue 606 and action status queue 608 of the blockchains 102j-l. Similarly, the emulated blockchains 102h',i' themselves may each comprise an interface in the form of a pending action queue 606 and action status queue 608, and an immediately preceding state of the host blockchains 102h,i, respectively, and omit some or all of the additional data comprising the host blockchains 102h,i, such as earlier versions of the emulated blockchains 102h',i' themselves.

Each of the hypervisors 800a is communicative with various system-level inputs and outputs that the host blockchains 102h,i may directly access and that the guest blockchains 102j-l may only access via the host blockchains 102h,i as described above in respect of FIG. 8B. In the example embodiment of FIG. 9, these system-level inputs and outputs are the user inputs 108, hardware 808, and cryptography module 902, which performs cryptography operations using private keys.

A host blockchain 102h,i may receive a message in the form of an action to perform from:

1. sources outside of the hypervisors 800a,b, such as the user inputs 108, hardware 808, and cryptography module 902, which send system-level actions directly to the host blockchains 102h,i;
2. the guest blockchains 102j-l, which send system-level actions to the emulated blockchains 102h',i' via chain joining that the host blockchains 102h,i collect. An emulated blockchain 102h',i' may receive an action from another of the guest blockchains 102j-l hosted on the same host blockchain 102h,i as the emulated blockchain 102h',i' that receives the action or from a guest blockchain 102j-l hosted on another host blockchain 102h,i; and
3. the emulated blockchain 102h',i' hosted on the other host blockchain 102h,i, which sends system-level actions via chain joining to the emulated blockchain 102h',i' hosted by the host blockchain 102h,i that receives the action.

Actions sent directly to the host blockchains 102h,i from sources outside of the hypervisors 800a,b are not communicated using chain joining. Actions received at one of the emulated blockchains 102*h',i'* from the other of the emulated blockchains 102*h',i'* or the guest blockchains 102*j-l* are sent via chain joining, as described above. For example, any guest blockchains 102*j-l* or the second emulated blockchain 102*i'* may, by using a write join, send an action to the first emulated blockchain 102*h'*; in this example, that guest blockchain 102*j-l* acts as the sender chain 102*a* of FIG. 6, and the first emulated blockchain 102*h'* comprises local action queues in the form of the pending action queue 606*b* and action status queue 608*b* of FIG. 6 and interfaces with that guest blockchain 102*j-l* as the receiver chain 102*b* would. The actions queue at the first emulated blockchain's 102*h'* pending action queue 606*b* and await retrieval by the first host blockchain 102*h*. Retrieval by the host blockchain 102*h* comprises the host blockchain 102*h* instructing the hypervisor 800*a* to retrieve those actions and to transition them to the system-wide action queue 816, which pools actions, system-wide, for multiple blockchains. In at least some example embodiments, once those retrieved actions are moved to the system-wide action queue 816 they are indistinguishable from actions placed there in a method other than hyperconvergent chain joining (e.g., such as via direct user input).

As the action sent to the first emulated blockchain 102*h'* is transmitted using a write join, when one of the guest blockchains 102*j-l* is the source of the action, the first emulated blockchain 102*h'* receives from that guest blockchain 102*j-l* lineage verification data that permits the first host blockchain 102*h* to verify a lineage of at least one block of the originating blockchain, which is one of the guest blockchains 102*j-l*; a proper subset of all non-header data stored using the at least one block, wherein the proper subset of the non-header data comprises the action received from the guest blockchain 102*j-l*; and validity verification data that permits the first host blockchain 102*h* to verify validity of the proper subset of all non-header data sent to the first host blockchain 102*h* from the guest blockchain 102*j-l*. When the second emulated blockchain 102*i'* is the source of the action, the first emulated blockchain 102*h'* receives from the second emulated blockchain 102*i'* lineage verification data that permits the first host blockchain 102*h* to verify a lineage of at least one block of the second emulated blockchain 102*i'*, which in at least some example embodiments corresponds to the lineage of the second host blockchain 102*i*; a proper subset of all non-header data stored using the at least one block, wherein the proper subset of the non-header data comprises the action received from the second emulated blockchain 102*i'*; and validity verification data that permits the first host blockchain 102*h* to verify validity of the proper subset of all non-header data sent to the first emulated blockchain 102*h'* from the second emulated blockchain 102*i'*.

Following the host blockchain's 102*h,i* performance of the action it receives, the host blockchain 102*h,i* may return an acknowledgement to the blockchain that originated that action as part of the write join. An example of a response is the update sent via a read join from the action status queue 608*b* of the receiver chain 102*b* to the action status queue 608*a* of the sender chain 102*a* in FIG. 6. For example, when the first host blockchain 102*h* performs an action, the first emulated blockchain 102*h'* may send a response back by placing the response in its action status queue 608*b*, which is then transmitted via a read join to that originator's action status queue 608*a*. The originator may be, for example, one of the guest blockchains 102*j-l* if the action originated from one of the guest blockchains 102*j-l* and was retrieved by the first host blockchain 102*h* at the first emulated blockchain 102*h'*, or the second emulated blockchain 102*i'* if the action was retrieved by the first host blockchain 102*h* at the first emulated blockchain 102*h'* and was sent to the first emulated blockchain 102*h'* by the second emulated blockchain 102*i'*.

As used herein, a "system-level" action is an action that one of the hypervisors 800*a,b* performs whose effects are isolated physically by the computer node 104*m,n* on which the action is run as opposed to by any particular guest blockchain 102*j-l*. Examples of system-level actions comprise actions to shut down the hypervisor 800*a*, to cause the hypervisor 800*a* to regenerate cryptographic keys, to cause the hypervisor 800*a* to stop hosting one or more blockchains, and to cause the hypervisor 800*a* to start hosting one or more blockchains. A system-level action contrasts with an action performed by one of the hypervisors 800*a,b* whose effects are isolated to the particular one of the guest blockchains 102*j-l* that requests it ("local action"). The system-level actions are accordingly performed in the system's 100 kernel space, while local actions are performed in the system's 100 user space.

Referring now to FIG. 10, the method 1000 to add a new block to one of the emulated blockchains 102*h',i'* begins at block 1002. For the purposes of describing FIG. 10 below, an example embodiment of FIG. 10 in which a new block is added to the emulated blockchain 102*h'* running on the first host blockchain 102*h* is considered (this description applies analogously to the emulated blockchain 102*i'* running on the second host blockchain 102*i*). The method 1000 proceeds to block 1004, where the first hypervisor 800*a* is run on a first computer node in the form of the thirteenth computer node 104*m*. The first hypervisor 800*a* in turn runs the first host blockchain 102*h*. As shown in FIG. 9, the first host blockchain 102*h* also runs guest blockchains in the form of the ninth and tenth blockchains 102*j,k*. While the embodiment of FIG. 9 shows one hypervisor 800*a,b* running on each of the nodes 104*m,n*, in at least some different example embodiments (not depicted) one or both nodes 104*m,n* may each run one or more hypervisors 800*a,b*.

The method 1000 then proceeds to block 1006, in which the first host blockchain 102*h* runs the first emulated blockchain 102*h'*. The first emulated blockchain 102*h'* consequently runs on the first hypervisor 800*a*. As shown in FIG. 9 and as discussed further in respect of blocks 1008-1012 below, the first emulated blockchain 102*h'* stores a state the emulated ninth and tenth blockchains 102*j',k'* corresponding to a previous state of the host blockchain 102*h*.

At block 1008, the first host blockchain 102*h* determines its subsequent state. In order to do this, the first host blockchain 102*h* retrieves the actions it receives directly from sources outside the hypervisor 800*a* and those actions it receives via the first emulated blockchain 102*h'*, as described above. Following retrieval, the first host blockchain 102*h* performs those actions. Each time one of those actions is performed, the first host blockchain 102*h* advances to a subsequent state. More particularly, once the first host blockchain 102*h* retrieves the actions, the hypervisor 800 creates a new block for it and performs the action on behalf of the first host blockchain 102*h*. As the first host blockchain 102*h* has only one node, consensus is achieved by accepting the result of the action's performance. The first host blockchain 102*h* updates its state using that result, which adds a block to the first host blockchain 102*h*, and then performs the side effects of that block.

After performing block 1008, the first host blockchain 102*h* proceeds to block 1010. At block 1010, the first host blockchain 102*h* determines the contents of the next block of the first emulated blockchain 102*h'* by removing, from the subsequent state of the first host blockchain 102*h* determined at block 1008, state information representing the emulated blockchain 102*h*'. In at least the example embodiment of FIG. 9, all information representing the emulated blockchain 102*h*' is removed. Removing the information representing the emulated blockchain 102*h*' from the block that is to be added to the first emulated blockchain 102*h*' avoids a "telescoping" computer problem in which the first emulated blockchain 102*h*' would be used to store an increasingly large number of copies of itself, which eventually would consume the memory of the system 100. If the emulated blockchain 102*h*' were not removed at block 1008, the new block to be added to the emulated blockchain 102*h*' would further comprise a copy 102*h*" of the emulated blockchain 102*h*'; similarly, the subsequent block would comprise a copy 102*h*''' of the copy 102*h*", and so on. The proliferation of copies in this manner may consume the system's 100 available memory and/or storage.

After block 1010, the first host blockchain 102*h* moves to block 1012 and adds a new block to the first emulated blockchain 102*h*'. The new block comprises the subsequent state of the first host blockchain 102*h* with the state information representing the first emulated blockchain 102*h*', as determined at block 1010. Performing the act of adding the new block to the first emulated blockchain 102*h*' advances the first host blockchain 102*h* to a subsequent state; consequently, the first emulated blockchain 102*h*' is at least one state behind the present state of the first host blockchain 102*h*, and the emulated ninth and tenth blockchains 102*j*',*k*' are from that previous state of the first host blockchain 102*h*. In at least some example embodiments, the state of at least one of the emulated ninth and tenth blockchains 102*j*',*k*' is accordingly different from the state of the ninth and tenth blockchains 102*j,k* running on the first host blockchain 102*h* immediately before it performs block 1012. In at least some different example embodiments, the states of the emulated blockchains 102*j*',*k*' are identical to the states of the ninth and tenth blockchains 102*j,k* running on the first host blockchain 102*h* immediately after it performs block 1012, regardless of the fact that the first host blockchain 102*h* and the first emulated blockchain 102*h*' are at least one state different. Furthermore, while in at least some example embodiments the act of adding a new block to the first emulated blockchain 102*h*' may also comprise adding a new block to the first host blockchain 102*h*, in some other example embodiments a new block may be added to the first emulated blockchain 102*h*' without adding a new block to the first host blockchain 102*h*.

After block 1012 is performed, the method 1000 ends at block 1014.

The new block added at block 1012 may be a heavy block or a light block. If a heavy block, the new block passes consensus, is disseminated to the nodes 104 that host the emulated blockchain 102*h*', and is committed to the non-volatile storage 112. If a light block, the new block does not pass consensus, is not disseminated to any other nodes 104, and remains in the RAM 110 without being committed to the non-volatile storage 112. The first host blockchain 102*h* may perform multiple actions and consequently advance multiple states prior to a single light block being generated, and multiple light blocks may be created prior to a single heavy block being created. A light block accordingly comprises a list of one or more actions, and a heavy block comprising multiple light blocks comprises a list of actions performed since the last heavy block of the first host blockchain 102*h*. In the event the system 100 crashes, the first host blockchain 102*h* can, upon rebooting, recover to the state resulting from the last action stored as a heavy block on the first host blockchain 102*h*. Actions stored only in light blocks are lost in the crash, as they are stored only in volatile memory until they are stored as a heavy block and consequently committed to non-volatile storage.

By sending actions to the first emulated blockchain 102*h*', the first host blockchain 102*h* can effectively be chain joined with any of the guest blockchains 102*j-l*, and to the second host blockchain 102*i*; that chain joining may comprise one or both of read joins and write joins between the first host blockchain 102*h* and any of those other blockchains 102*i,j-l*. Actions sent to the first host blockchain 102*h* are transmitted via the first emulated blockchain 102*h*' and, in the case of actions from the second host blockchain 102*i*, also via the second emulated blockchain 102*i*'. When the first host blockchain 102*h* performs a read join on the second host blockchain 102*i*, the first host blockchain 102*h* is able to access information on the second host blockchain's 102*i* resources or view of the world. For example, a read join set up to allow the first host blockchain 102*h* to access the second host blockchain's 102*i* state at path \containers\network\connections provides the first host blockchain 102*i*, on successful mount, with an automatically maintained list of network addresses with which the second host blockchain 102*i* is attempting to remain connected. That information may permit the first host blockchain 102*h* to make those connections itself, which is one way peer discovery may be implemented. Similarly, in a large network of interconnected host blockchains, those host blockchains would have information that would permit them to select the shortest path for rebroadcasting information within that network by observing the tree of connections, which may be used to implement a gossip protocol.

In another example embodiment, read joins between a network of host blockchains may permit each of those key value stores to manage a partition of a collectively managed key space, which is one example of disk sharding among nodes of the blockchain.

Additionally or alternatively, one of the host blockchains 102*h,i* may perform a write join on the other to control the behavior of the other. In the example of shared network addresses above, the first host blockchain 102*h* may perform a write join on the second host blockchain 102*i* to instruct the second host blockchain 102*i* to assume responsibility for some of the network connections being managed by the first host blockchain 102*h*. This may be done when, for example, the first host blockchain 102*h* is overloaded with concurrent connections and the second host blockchain 102*i* is relatively idle. Similarly, in the disk sharding example above, if the first host blockchain 102*h* receives a block that was not in its partition, it may look up that the block is in the partition of the second host blockchain 102*i* and forward the block there via the write join.

The host blockchains 102*h,i* may also be chain joined with the guest blockchains 102*j-l*. For example, the ninth blockchain 102*j* may perform a read join with the first host blockchain 102*h* to monitor, for example, the blocker (responsible for creating/executing a block), effector (responsible for running side effects and providing appropriate isolation), network (responsible for network access), crypto (responsible for cryptography), and kvStore (responsible for the key value store) state slices to ascertain the load the first host blockchain 102*h* is under, and whether that load is balanced between available nodes 104. Any of the guest blockchains 102*j-l* may also perform a write join on the first host blockchain 102*h* to control the node 104*m* that runs it. For example, the ninth blockchain 102*j* may use a write join to cause the first host blockchain 102*h* to demote the node 104*m* out of a validator group if it is overwhelmed, to move connections between nodes, and to add new nodes to the blockchain 102*j* if the node 104*m* has the ability to communicate with a cloud provider and provide resources. More generally, a guest blockchain 102*j-l* that may perform a write join on the first host blockchain 102*h* may perform any hardware operation that the first host blockchain 102*h* may do (e.g., shutdown, power cycling). This may be done without a separate control layer and any attendant administrators. Effectively, in at least some example embodiments this permits the hardware layer and application layer (i.e., the guest blockchains 102*j-l*) to be merged, permitting hyperconvergence.

The embodiments have been described above with reference to flow, sequence, and block diagrams of methods, apparatuses, systems, and computer program products. In this regard, the depicted flow, sequence, and block diagrams illustrate the architecture, functionality, and operation of implementations of various embodiments. For instance, each block of the flow and block diagrams and operation in the sequence diagrams may represent a module, segment, or portion of code, which comprises one or more executable instructions for implementing the specified action(s). In some alternative embodiments, the action(s) noted in that block or operation may occur out of the order noted in those figures. For example, two blocks or operations shown in succession may, in some embodiments, be executed substantially concurrently, or the blocks or operations may sometimes be executed in the reverse order, depending upon the functionality involved. Some specific examples of the foregoing have been noted above but those noted examples are not necessarily the only examples. Each block of the flow and block diagrams and operation of the sequence diagrams, and combinations of those blocks and operations, may be implemented by special purpose hardware-based systems that perform the specified functions or acts, or combinations of special purpose hardware and computer instructions.

The terminology used herein is for the purpose of describing particular embodiments only and is not intended to be limiting. Accordingly, as used herein, the singular forms "a", "an", and "the" are intended to include the plural forms as well, unless the context clearly indicates otherwise. It will be further understood that the terms "comprises" and "comprising", when used in this specification, specify the presence of one or more stated features, integers, steps, operations, elements, and components, but do not preclude the presence or addition of one or more other features, integers, steps, operations, elements, components, and groups. Directional terms such as "top", "bottom", "upwards", "downwards", "vertically", and "laterally" are used in the following description for the purpose of providing relative reference only, and are not intended to suggest any limitations on how any article is to be positioned during use, or to be mounted in an assembly or relative to an environment. Additionally, the term "couple" and variants of it such as "coupled", "couples", and "coupling" as used in this description are intended to include indirect and direct connections unless otherwise indicated. For example, if a first device is coupled to a second device, that coupling may be through a direct connection or through an indirect connection via other devices and connections. Similarly, if the first device is communicatively coupled to the second device, communication may be through a direct connection or through an indirect connection via other devices and connections.

It is contemplated that any part of any aspect or embodiment discussed in this specification can be implemented or combined with any part of any other aspect or embodiment discussed in this specification.

In construing the claims, it is to be understood that the use of computer equipment, such as a processor, to implement the embodiments described herein is essential at least where the presence or use of that computer equipment is positively recited in the claims. It is also to be understood that implementing a blockchain inherently requires computer equipment, such as a processor for creating and authenticating new blocks, storage for storing the blockchain, and a network interface for allowing communication between nodes, which is required for consensus.

One or more example embodiments have been described by way of illustration only. This description is been presented for purposes of illustration and description, but is not intended to be exhaustive or limited to the form disclosed. It will be apparent to persons skilled in the art that a number of variations and modifications can be made without departing from the scope of the claims.

The invention claimed is:

1. A method comprising:
    (a) running a first hypervisor on a first computer node, wherein the hypervisor comprises a first host blockchain;
    (b) running on the hypervisor a first emulated blockchain that emulates the first host blockchain;
    (c) determining a subsequent state of the host blockchain;
    (d) removing, from the subsequent state of the host blockchain, state information representing the emulated blockchain; and
    (e) adding a new block to the emulated blockchain, wherein the new block comprises the subsequent state of the host blockchain with the state information representing the emulated blockchain removed.

2. The method of claim 1, wherein determining the subsequent state of the host blockchain comprises:
    (a) retrieving, by the host blockchain, an action received by the emulated blockchain; and
    (b) performing, by the host blockchain, the action retrieved from the emulated blockchain.

3. The method of claim 2, wherein the action received by the emulated blockchain is a system-level action.

4. The method of claim 2, further comprising running a guest blockchain on the hypervisor, wherein the host blockchain allocates at least some hardware resources of the node in response to a request from the guest blockchain.

5. The method of claim 4, wherein the action received by the emulated blockchain is received from the guest blockchain.

6. The method of claim 5, further comprising receiving, from the guest blockchain at the emulated blockchain:
    (a) lineage verification data that permits the host blockchain to verify a lineage of at least one block of the guest blockchain;
    (b) a proper subset of all non-header data stored using the at least one block, wherein the proper subset of the non-header data comprises the action received from the guest blockchain; and
    (c) validity verification data that permits the host blockchain to verify validity of the proper subset of all non-header data sent to the host blockchain from the guest blockchain.

7. The method of claim 5, further comprising the host blockchain performing the action received by the emulated blockchain and sending a response to the guest blockchain.

8. The method of claim 7, wherein the response comprises:
(a) lineage verification data that permits the guest blockchain to verify a lineage of at least one block of the host blockchain;
(b) a proper subset of all non-header data stored using the at least one block, wherein the proper subset of the non-header data comprises an acknowledgement of whether the action was performed; and
(c) validity verification data that permits the guest blockchain to verify validity of the proper subset of all non-header data sent to the guest blockchain from the host blockchain.

9. The method of claim 4, wherein the subsequent state of the host blockchain with the state information representing the emulated blockchain removed comprises a listing of and a state of the guest blockchain.

10. The method of claim 2, wherein a second hypervisor is running on a second computer node, the second hypervisor comprises a second host blockchain, a second emulated blockchain that emulates the second host blockchain is running on the second hypervisor, and the action received by the first emulated blockchain is received from the second emulated blockchain.

11. The method of claim 10, further comprising receiving, from the second emulated blockchain at the first emulated blockchain:
(a) lineage verification data that permits the first host blockchain to verify a lineage of at least one block of the second host blockchain;
(b) a proper subset of all non-header data stored using the at least one block, wherein the proper subset of the non-header data comprises the action received from the second emulated blockchain; and
(c) validity verification data that permits the first host blockchain to verify validity of the proper subset of all non-header data sent to the first emulated blockchain from the second emulated blockchain.

12. The method of claim 10, further comprising the first host blockchain performing the action received by the first emulated blockchain and sending a response to the second emulated blockchain.

13. The method of claim 12, wherein the response sent to the second emulated blockchain comprises:
(a) lineage verification data that permits the second host blockchain to verify a lineage of at least one block of the first host blockchain;
(b) a proper subset of all non-header data stored using the at least one block, wherein the proper subset of the non-header data comprises an acknowledgement of whether the action received by the first emulated blockchain was performed; and
(c) validity verification data that permits the second host blockchain to verify validity of the proper subset of all non-header data sent to the second emulated blockchain from the first host blockchain.

14. The method of claim 1, wherein adding a new block to the emulated blockchain is performed by the first host blockchain such that the emulated blockchain is at least one state behind a state of the first host blockchain.

15. The method of claim 1, wherein the new block added to the emulated blockchain is distributed to all nodes hosting the emulated blockchain.

16. The method of claim 1, wherein the subsequent state is a last one of multiple subsequent states determined of the host blockchain, the multiple subsequent states are determined in response to respective actions, and the new block added to the emulated blockchain comprises a list of the respective actions.

17. A system comprising:
(a) network interface hardware for interfacing with another computer node;
(b) non-volatile memory having stored on it a first host blockchain and a first emulated blockchain that emulates the first host blockchain;
(c) a processor communicatively coupled to the data store and network interface hardware; and
(d) a memory communicatively coupled to the processor and having stored on it computer program code that is executable by the processor and that when executed by the processor causes the processor to perform a method comprising:
(i) running a first hypervisor on a first computer node, wherein the hypervisor comprises a first host blockchain;
(ii) running on the hypervisor a first emulated blockchain that emulates the first host blockchain;
(iii) determining a subsequent state of the host blockchain;
(iv) removing, from the subsequent state of the host blockchain, state information representing the emulated blockchain; and
(v) adding a new block to the emulated blockchain, wherein the new block comprises the subsequent state of the host blockchain with the state information representing the emulated blockchain removed.

18. A non-transitory computer readable medium having stored thereon computer program code that is executable by a processor and that when executed by the processor causes the processor to perform a method comprising:
(a) running a first hypervisor on a first computer node, wherein the hypervisor comprises a first host blockchain;
(b) running on the hypervisor a first emulated blockchain that emulates the first host blockchain;
(c) determining a subsequent state of the host blockchain;
(d) removing, from the subsequent state of the host blockchain, state information representing the emulated blockchain; and
(e) adding a new block to the emulated blockchain, wherein the new block comprises the subsequent state of the host blockchain with the state information representing the emulated blockchain removed.

* * * * *